(12) United States Patent
Malladi et al.

(10) Patent No.: US 8,665,809 B2
(45) Date of Patent: Mar. 4, 2014

(54) SYSTEMS AND METHODS FOR SENDING POWER CONTROL INFORMATION

(75) Inventors: Durga Prasad Malladi, San Diego, CA (US); Yongbin Wei, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 471 days.

(21) Appl. No.: 12/815,227

(22) Filed: Jun. 14, 2010

(65) Prior Publication Data

US 2011/0188460 A1 Aug. 4, 2011

Related U.S. Application Data

(60) Provisional application No. 61/187,218, filed on Jun. 15, 2009.

(51) Int. Cl.
*H04W 52/02* (2009.01)

(52) U.S. Cl.
USPC .......................................... 370/329; 455/13.4

(58) Field of Classification Search
CPC ...................... H04W 52/0209; H04W 52/0212
See application file for complete search history.

(56) References Cited

U.S. PATENT DOCUMENTS

| | | | |
|---|---|---|---|
| 2002/0176362 A1* | 11/2002 | Yun et al. | 370/236 |
| 2005/0030911 A1* | 2/2005 | Tiedemann et al. | 370/278 |
| 2005/0058154 A1* | 3/2005 | Lee et al. | 370/473 |
| 2008/0316950 A1 | 12/2008 | Damnjanovic | |
| 2009/0088148 A1* | 4/2009 | Chung et al. | 455/423 |
| 2011/0116465 A1* | 5/2011 | Miki et al. | 370/329 |

FOREIGN PATENT DOCUMENTS

| | | |
|---|---|---|
| WO | WO2009041785 | 4/2009 |
| WO | WO2009048404 | 4/2009 |

OTHER PUBLICATIONS

International Search Report and Written Opinion—PCT/US2010/038734, International Search Authority—European Patent Office—Sep. 23, 2010.
Way Forward on Downlink Control Signali ng , [Online] vol. R1-071223, No. Agenda Item 6.9.2, pp. 1-6, XP002512718 Retrieved from the Internet : URL: http ://www.3gpp. org/ftp/tsg-ran/WGI-RL I/TSGRI-48/Docs/RI-081223. zip>.
Taiwan Search Report—TW099119624—TIPO—Mar. 13, 2013.

\* cited by examiner

*Primary Examiner* — Jianye Wu
(74) *Attorney, Agent, or Firm* — Nerrie M. Zohn

(57) ABSTRACT

Systems and methodologies are described that facilitate sending a power control command in a wireless communication environment. A base station can send a power control command to a UE through resource elements reserved for at least one Physical Downlink Control Channel (PDCCH). Thus, the power control command can be punctured into a control channel element (CCE) reserved for the at least one PDCCH. Further, the base station can convey an indicator that specifies the resource elements reserved for the at least one PDCCH used for sending the power control command to the UE. Moreover, the base station can use a structure similar to a conventional (e.g., Release 8, . . . ) PHICH structure for sending the power control command using the resource elements reserved for the at least one PDCCH. For example, the power control command can be spread using one or more Walsh codes assigned to the UE.

38 Claims, 15 Drawing Sheets

SYSTEMS AND METHODS FOR SENDING POWER CONTROL INFORMATION

CROSS-REFERENCE TO RELATED APPLICATIONS

This application claims the benefit of U.S. Provisional Patent Application Ser. No. 61/187,218 entitled "METHODS OF SENDING POWER CONTROL INFORMATION" which was filed Jun. 15, 2009. The entirety of the aforementioned application is herein incorporated by reference.

BACKGROUND

I. Field

The following description relates generally to wireless communications, and more particularly to sending power control information in a wireless communication system.

II. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), multi-carrier wireless specifications such as evolution data optimized (EV-DO), one or more revisions thereof, etc.

Generally, wireless multiple-access communication systems can simultaneously support communication for multiple user equipments (UEs). Each UE can communicate with one or more base stations via transmissions on forward and reverse links. The forward link (or downlink) refers to the communication link from base stations to UEs, and the reverse link (or uplink) refers to the communication link from UEs to base stations. Further, communications between UEs and base stations can be established via single-input single-output (SISO) systems, multiple-input single-output (MISO), multiple-input multiple-output (MIMO) systems, and so forth. In addition, UEs can communicate with other UEs (and/or base stations with other base stations) in peer-to-peer wireless network configurations.

In a wireless communication environment, a power control command can be sent on a downlink from a base station to a UE. The power control command sent on the downlink can support uplink power control. Thus, the power control command can cause the UE to increase, decrease, or maintain a transmit power for sending an uplink transmission.

Conventionally, the power control command can be included in downlink control information (DCI), which can be carried by a downlink control channel such as a Physical Downlink Control Channel (PDCCH). The DCI can include downlink or uplink scheduling information and the power control command. For instance, one or two (or more) bits corresponding to the power control command can be embedded in a payload of the downlink control channel (e.g., the PDCCH, . . . ).

Sending the power control command embedded in the payload of the downlink control channel while in various scenarios can be wasteful. For example, if scheduling information need not be provided to the UE, such as when the UE has a persistent assignment or a semi-persistent assignment in the uplink, then employing a format that typically schedules an uplink transmission where the power control command is specified by one or two bits can yield inefficient utilization of resources. According to another example, if a limited number of UEs are activated in a cell, then employing a format that sends group power control for the UEs can similarly result in inefficient utilization of resources.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating sending of a power control command in a wireless communication environment. A base station can send a power control command to a UE through resource elements reserved for at least one Physical Downlink Control Channel (PDCCH). Thus, the power control command can be punctured into a control channel element (CCE) reserved for the at least one PDCCH. Further, the base station can convey an indicator that specifies the resource elements reserved for the at least one PDCCH used for sending the power control command to the UE. Moreover, the base station can use a structure similar to a conventional (e.g., Release 8, . . . ) PHICH structure for sending the power control command using the resource elements reserved for the at least one PDCCH. For example, the power control command can be spread using one or more Walsh codes assigned to the UE.

According to related aspects, a method that facilitates controlling uplink power in a wireless communication environment is described herein. The method can include generating a power control command for a user equipment (UE). Further, the method can include sending the power control command to the UE through resource elements reserved for at least one Physical Downlink Control Channel (PDCCH).

Another aspect relates to a wireless communications apparatus. The wireless communications apparatus can include a memory that retains instructions related to generating a power control command for a user equipment (UE), mapping the power control command to resource elements reserved for at least one Physical Downlink Control Channel (PDCCH), and sending the power control command to the UE through the resource elements reserved for the at least one PDCCH. Further, the wireless communications apparatus can include a processor, coupled to the memory, configured to execute the instructions retained in the memory.

Yet another aspect relates to a wireless communications apparatus that enables controlling uplink power in a wireless communication environment. The wireless communications apparatus can include means for generating a power control command for a user equipment (UE). Moreover, the wireless communications apparatus can include means for sending the power control command to the UE through resource elements reserved for at least one Physical Downlink Control Channel (PDCCH).

Still another aspect relates to a computer program product that can comprise a computer-readable medium. The computer-readable medium can include code for generating a power control command for a user equipment (UE). Further, the computer-readable medium can include code for sending the power control command to the UE through resource elements reserved for at least one Physical Downlink Control Channel (PDCCH).

In accordance with another aspect, a wireless communications apparatus can include a processor, wherein the processor can be configured to generate a power control command for a user equipment (UE). Further, the processor can be configured to spread the power control command using a Walsh code assigned to the UE. Moreover, the processor can be configured to map the power control command to resource elements reserved for at least one Physical Downlink Control Channel (PDCCH). The processor can also be configured to send the power control command to the UE through the resource elements reserved for the at least one PDCCH.

According to other aspects, a method that facilitates altering an uplink transmit power in a wireless communication environment is described herein. The method can include receiving a power control command from a base station through resource elements reserved for at least one Physical Downlink Control Channel (PDCCH). Moreover, the method can include adjusting a transmit power for an uplink transmission based upon the power control command.

Another aspect relates to a wireless communications apparatus. The wireless communications apparatus can include a memory that retains instructions related to receiving a power control command from a base station through resource elements reserved for at least one Physical Downlink Control Channel (PDCCH), and adjusting a transmit power for an uplink transmission based upon the power control command. Further, the wireless communications apparatus can include a processor, coupled to the memory, configured to execute the instructions retained in the memory.

Yet another aspect relates to a wireless communications apparatus that enables managing uplink power in a wireless communication environment. The wireless communications apparatus can include means for receiving a power control command from a base station through resource elements reserved for at least one Physical Downlink Control Channel (PDCCH). Moreover, the wireless communications apparatus can include means for adjusting a transmit power for an uplink transmission based upon the power control command.

Still another aspect relates to a computer program product that can comprise a computer-readable medium. The computer-readable medium can include code for receiving a power control command from a base station through resource elements reserved for at least one Physical Downlink Control Channel (PDCCH). Further, the computer-readable medium can include code for adjusting a transmit power for an uplink transmission based upon the power control command.

In accordance with another aspect, a wireless communications apparatus can include a processor, wherein the processor can be configured to receive a power control command from a base station through resource elements reserved for at least one Physical Downlink Control Channel (PDCCH). Further, the processor can be configured to detect the power control command utilizing one or more Walsh codes assigned to a user equipment (UE). Moreover, the processor can be configured to adjust a transmit power for an uplink transmission based upon the power control command.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
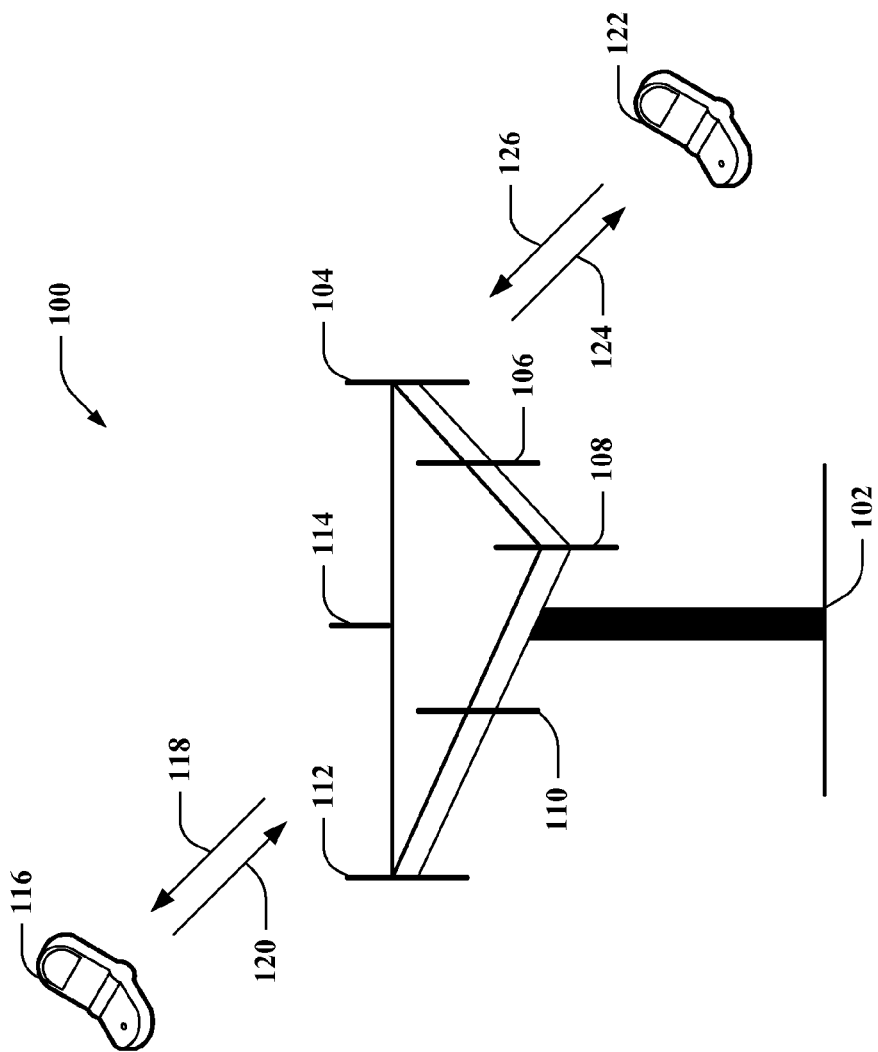
FIG. 1 is an illustration of a wireless communication system in accordance with various aspects set forth herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspects(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Various techniques described herein can be used for various wireless communication systems, such as code division multiple access (CDMA) systems, time division multiple access (TDMA) systems, frequency division multiple access (FDMA) systems, orthogonal frequency division multiple access (OFDMA) systems, single carrier-frequency division multiple access (SC-FDMA) systems, and other such systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95, and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits UEs in terms of transmit power efficiency. Accordingly, SC-FDMA can be implemented as an uplink multiple access scheme in 3GPP Long Term Evolution (LTE) or Evolved UTRA.

Furthermore, various aspects are described herein in connection with a user equipment (UE). A UE can refer to a device providing voice and/or data connectivity. A UE can be connected to a computing device such as a laptop computer or desktop computer, or it can be a self-contained device such as a personal digital assistant (PDA). A UE can also be called a system, subscriber unit, subscriber station, mobile station, mobile, remote station, remote terminal, mobile device, user terminal, terminal, wireless communication device, user agent, user device, or access terminal. A UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various aspects are described herein in connection with a base station. A base station can be utilized for communicating with UE(s) and can also be referred to as an access point, Node B, Evolved Node B (eNodeB, eNB) or some other terminology. A base station can refer to a device in an access network that communicates over the air interface, through one or more sectors, with UEs. The base station can act as a router between the wireless terminal and the rest of the access network, which can include an Internet Protocol (IP) network, by converting received air interface frames to IP packets. The base station can also coordinate management of attributes for the air interface.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various aspects will be presented in terms of systems that can include a number of devices, components, modules, and the like. It is to be understood and appreciated that the various systems can include additional devices, components, modules, etc. and/or one or more of the devices, components, modules etc. discussed in connection with the figures need not be included. A combination of these approaches can also be used.

Referring now to FIG. 1, a system 100 is illustrated in accordance with various aspects presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more user equipments (UEs) such as UE 116 and UE 122; however, it is to be appreciated that base station 102 can communicate with substantially any number of UEs similar to UE 116 and UE 122. UE 116 and UE 122 can be, for example, cellular phones, smart phones, laptops, handheld communication devices, handheld computing devices, satellite radios, global positioning systems, PDAs, and/or any other suitable device for communicating over system 100. As depicted, UE 116 is in communication with antennas 112 and 114, where antennas 112 and 114 transmit information to UE 116 over a forward link 118 and receive information from UE 116 over a reverse link 120. Moreover, UE 122 is in communication with antennas 104 and 106, where antennas 104 and 106 transmit information to UE 122 over a forward link 124 and receive information from UE 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to UEs in a sector of the areas covered by base station 102. In communication over forward links 118 and 124, the transmitting antennas of base station 102 can utilize beamforming to improve signal-to-noise ratio of forward links 118 and 124 for UE 116 and UE 122. Also, while base station 102 utilizes beamforming to transmit to UE 116 and UE 122 scattered randomly through an associated coverage, UEs in neighboring cells can be subject to less interference as compared to a base station transmitting through a single antenna to all its UEs.

In system 100, base station 102 can generate respective power control commands for UE 116 and UE 122. Further, base station 102 can send the respective power control commands to UE 116 and UE 122 through resource elements reserved for at least one Physical Downlink Control Channel (PDCCH). For instance, a power control command for UE 116 (or for UE 122) can be punctured into a control channel element (CCE) reserved for the at least one PDCCH. Moreover, the power control command can be used by UE 116 (or UE 122) to increase, decrease, or maintain a transmit power for sending an uplink transmission (e.g., on a Physical Uplink Shared Channel (PUSCH), on a Physical Uplink Control Channel (PUCCH), . . . ). It is contemplated that a power control command can also be referred to as a transmit power control (TPC) command.

A power control command for a given UE can be conveyed by base station 102 without being encoded with scheduling information or power control command(s) for other UE(s). Hence, base station 102 can send a power control command to UE 116 through resource elements reserved for at least one PDCCH without encoding the power control command with scheduling information or power control commands for other UEs (e.g., UE 122, disparate UE(s) (not shown), . . . ).

In contrast to the foregoing, conventional approaches oftentimes send a power control command as part of a payload of a PDCCH. Thus, the PDCCH can carry a message referred to as a downlink control information (DCI) message, which can include the power control command as well as scheduling information (e.g., DCI format 0 with an individual power control command, . . . ) or power control commands for other UEs (e.g., DCI format 3/3A, group power control, . . . ). However, utilization of DCI format 0 can be inefficient when base station 102 sends a power control command without scheduling information and employment of DCI format 3/3A can be inefficient when a small number of UEs (e.g., UE 116, UE 122, . . . ) are activated in a cell associated with base station 102.

DCI format 0 can be used for transmission of resource grants for a PUSCH. A payload of a DCI format 0 message can include the following information: a flag to differentiate between DCI format 0 and DCI format 1A; a resource block grant; modulation and coding scheme; Hybrid Automatic Repeat Request (HARD) information and redundancy version; a power control command for the scheduled PUSCH; and a channel quality indicator (CQI) request. The power control command typically can be two bits included in the payload of the DCI format 0 message, while much of the information commonly included in the payload of the DCI format 0 message can relate to a grant. Hence, use of DCI format 0 can be wasteful if the power control command is sent without a grant, such as when a UE (e.g., UE 116, UE 122, . . . ) has a persistent assignment or a semi-persistent assignment in the uplink.

DCI format 3 and DCI format 3A can be used for transmission of power control commands for a PUCCH and a PUSCH. A payload of a DCI format 3 message can include two bit power control commands, while a payload of a DCI format 3A message can include one bit power control commands. DCI format 3/3A can be used for supplying individual power control commands for a group of UEs (e.g., UE 116, UE 122, disparate UE(s) (not shown), . . . ); hence, DCI format 3/3A can provide group power control by jointly coding the individual power control commands. For example, a 42 bit DCI format 3 message (or any other size DCI format 3 message) yielded by base station 102 can include a two bit power control command for UE 116 and a two bit power control command for UE 122. Further, respective two bit power control commands for other UE(s) served by base station 102 that are activated can be included in the 42 bit DCI format 3 message. However, if base station 102 serves a small number of UEs that are activated, then use of DCI format 3 (or DCI format 3A) can be wasteful.

Figure 2:
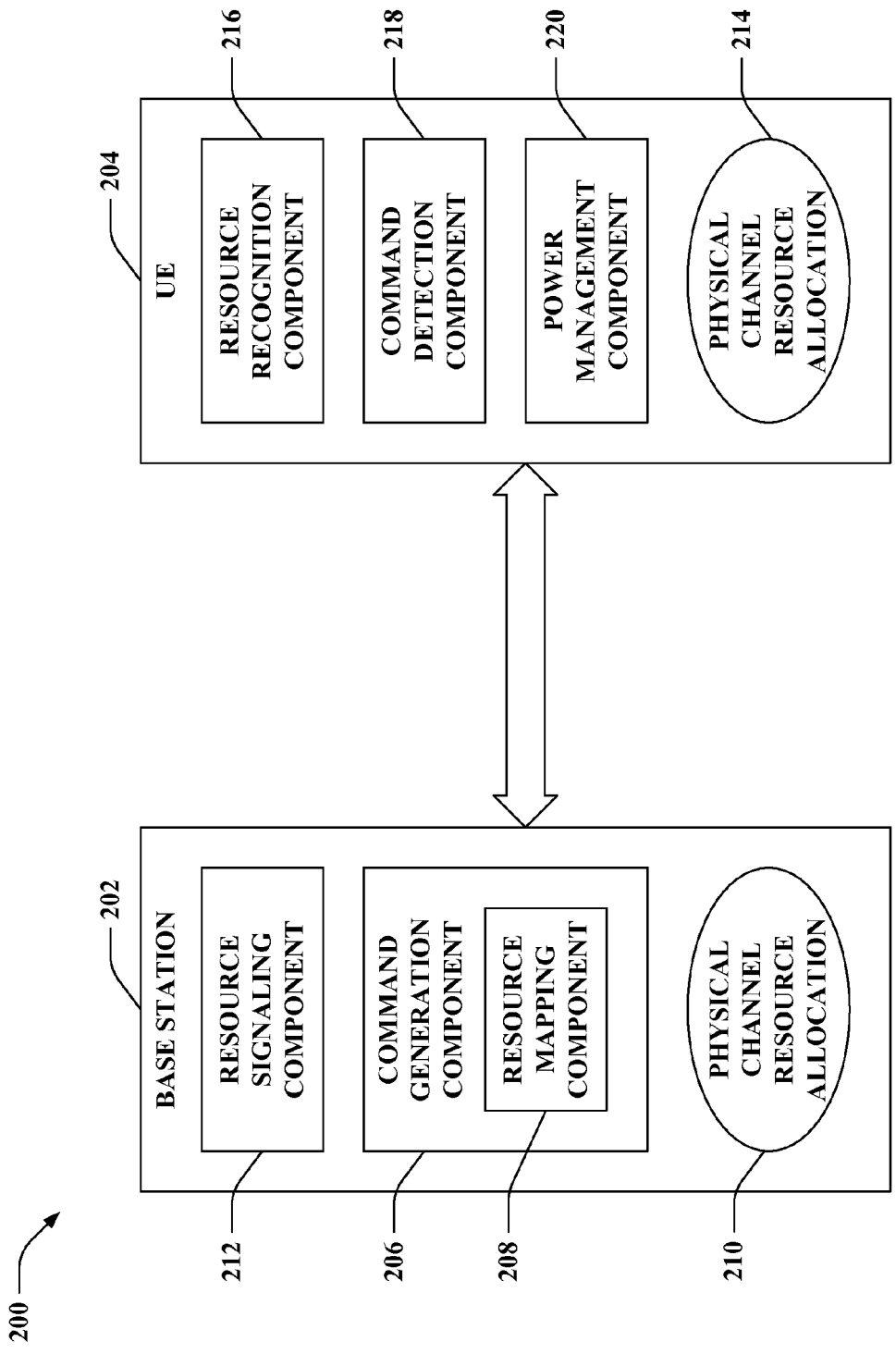
FIG. 2 is an illustration of an example system that sends power control commands in a wireless communication environment.

Now referring to FIG. 2, illustrated is a system 200 that sends power control commands in a wireless communication environment. System 200 includes a base station 202 that can transmit and/or receive information, signals, data, instructions, commands, bits, symbols, and the like. Base station 202 can communicate with a UE 204 via the forward link and/or reverse link. UE 204 can transmit and/or receive information, signals, data, instructions, commands, bits, symbols, and the like. Moreover, although not shown, it is contemplated that any number of base stations similar to base station 202 can be included in system 200 and/or any number of UEs similar to UE 204 can be included in system 200.

Base station 202 can include a command generation component 206 that can yield a power control command for UE 204. By way of illustration, the power control command yielded by command generation component 206 can signal a power step relative to a previous transmit power of UE 204. According to an example, the power step indicated by the power control command can be one of +3 dB or −3 dB. By way of another example, the power step indicated by the power control command can be one of +1 dB or −1 dB. According to yet another example, the power step indicated by the power control command can be one of −1 dB, 0 dB, +1 dB, or +3 dB. In accordance with another illustration, the power control command yielded by command generation component 206 can signal a power offset relative to a semi-static operating point. Following this illustration, the power offset indicated by the power control command can be one of −4 dB, −1 dB, +1 dB, or +4 dB, for example. It is to be appreciated, however, that the claimed subject matter is not limited to the above examples. Further, it is contemplated that command generation component 206 can yield power control command(s) for disparate UE(s) (not shown) served by base station 202.

Command generation component 206 can generate the power control command for UE 204 based upon various criteria. For instance, command generation component 206 can yield the power control command as a function of a received signal-to-interference ratio (SIR). Additionally or alternatively, command generation component 206 can yield the power control command as a function of an overload indicator received from a neighboring base station (not shown). The overload indicator, for instance, can indicate that the neighboring base station is overloaded on the uplink (e.g., experiencing interference from UE(s) in neighboring cell(s) above a threshold, . . . ). However, it is contemplated that the claimed subject matter is not limited to the foregoing examples.

Moreover, command generation component 206 can send the power control command to UE 204 through resource elements reserved for at least one PDCCH. Command generation component 206 can encode the power control command. For instance, command generation component 206 can use a structure similar to a conventional (e.g., Release 8, . . . ) Physical HARQ Indicator Channel (PHICH) structure for the power control command. Command generation component 206 can further include a resource mapping component 208 that maps the encoded power control command (e.g., with the structure similar to a conventional PHICH structure, . . . ) to resource elements reserved for at least one PDCCH.

Resource mapping component 208 can select the resource elements upon which the encoded power control command can be mapped based upon a physical channel resource allocation 210. Physical channel resource allocation 210 can indicate resource elements from a subframe reserved for at least one PDCCH. For example, the resource elements from the subframe reserved for at least one PDCCH can be included in a control region of the subframe. By way of another example, the resource elements from the subframe reserved for at least one PDCCH can be included in a data region of the subframe; such resource elements included in the data region can be reserved for one or more Relay-PDCCHs (R-PDCCHs).

By way of illustration, a subframe can include a control region and a data region. The control region, for instance, can typically include a first one, two, or three symbols (e.g., OFDM symbols, . . . ) of the subframe extending over a system bandwidth. Further, the data region can include a remainder of the symbols of the subframe extending over the system bandwidth.

Three types of downlink control channels can be transmitted by base station 202 upon resource elements from the control region of the subframe. The types of downlink control channels include Physical Control Format Indicator Channel (PCFICH), PHICH, and PDCCH. For example, PCFICH, PHICH, and PDCCH can be orthogonal; thus, resource elements respectively reserved for PCFICH, PHICH, and PDCCH can be non-overlapping. Further, resource elements from the control region of the subframe respectively reserved for a PCFICH, a PHICH, and one or more PDCCHs can be indicated in physical channel resource allocation 210.

A PCFICH can carry a control format indicator (CFI) that signals the number of symbols (e.g., typically one, two, or three, . . . ) included in the control region (e.g., used for transmission of control channel information in the subframe, . . . ). Resource elements carrying the PCFICH can span the system bandwidth in the first symbol of the subframe. For instance, sixteen resource elements can carry the PCFICH, and the sixteen resource elements can correspond to four resource element groups (REGs). The resource elements upon which the PCFICH can be mapped can be a function of a cell identifier (ID) corresponding to base station 202; the resource elements reserved for PCFICH can be specified in physical channel resource allocation 210.

The PHICH can be utilized to carry a HARQ acknowledgment/negative acknowledgment (ACK/NAK). The HARQ ACK/NAK can indicate whether base station 202 correctly received a PUSCH transmission. Resource elements from one, two, or three symbols from the control region of the subframe can carry the PHICH (e.g., the PHICH can be limited to the control region, . . . ). Further, the resource elements carrying the PHICH can span the system bandwidth and can be mapped as a function of cell ID; the resource elements reserved for the PHICH can be specified in physical channel resource allocation 210. For example, twelve resource elements (e.g., from one, two, or three symbols, . . . ) can carry the PHICH when employing normal cyclic prefix (CP), and the twelve resource elements can correspond to three REGs; however, the claimed subject matter is not limited to the foregoing example (e.g., it is contemplated that extended CP can be leveraged, . . . ).

One or more PDCCHs can be employed to carry respective DCI messages. For instance, several PDCCHs can be transmitted in a subframe. One, two, or three symbols in the control region of the subframe can be used for the one or more PDCCHs (e.g., as signaled by the PCFICH, . . . ). A PDCCH can be constructed as one or more CCEs, where a CCE can correspond to nine sets of four resource elements; thus, a CCE can include 36 resource elements. For example, it is contemplated that a PDCCH can be constructed as 1, 2, 4, or 8 CCEs; yet, the claimed subject matter is not so limited. A set of four resource elements can be referred to as a REG. The four resource elements of a REG can be within a resource block in a symbol. Further, a resource block can include two or three REGs depending upon whether or not the resource block in the symbol carries reference signals. Moreover, resource elements reserved for the one or more PDCCHs can be specified in physical channel resource allocation 210.

Figure 3:
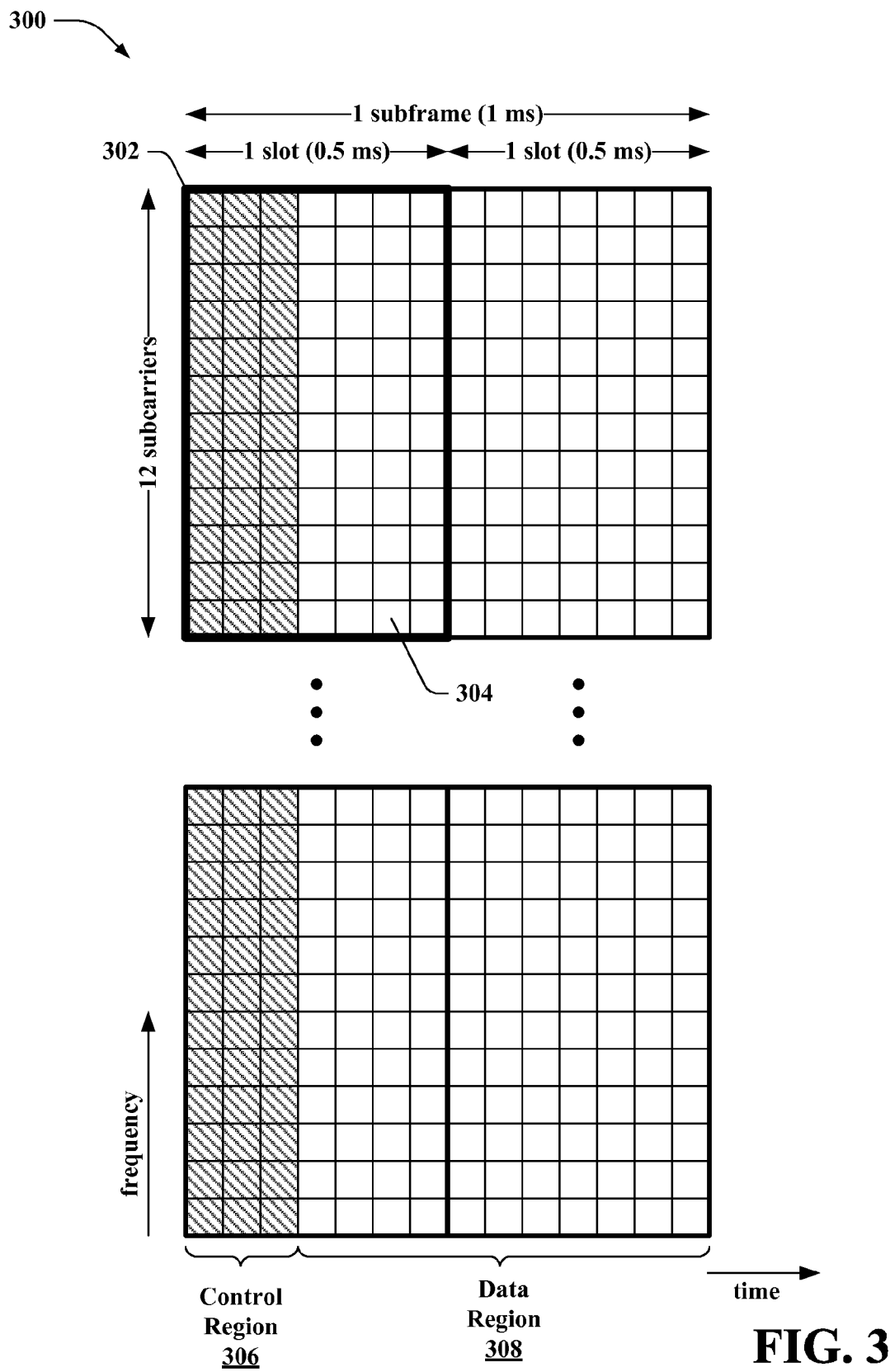
FIG. 3 is an illustration of an example subframe that can be leveraged in a wireless communication environment.

Turning to FIG. 3, illustrated is an example subframe 300 that can be leveraged in a wireless communication environment. Subframe 300 can be used for normal CP. It is to be appreciated that subframe 300 is provided as an example, and the claimed subject matter is not so limited.

Subframe 300 can have a duration of 1 ms, and can include two slots (e.g., each having a duration of 0.5 ms, . . . ). In the depicted example, a slot of subframe 300 can include seven symbols in the case of normal CP length; thus, subframe 300 can include fourteen symbols. By way of another example, it is contemplated that a subframe (not shown) that employs extended CP can include two slots, each of which can include six symbols. It is to be appreciated, however, that the claimed subject matter is not limited to the foregoing examples.

In the frequency domain, resources of subframe 300 can be grouped in units of twelve subcarriers (e.g., 180 kHz, . . . ). A unit of twelve subcarriers for a duration of one slot (e.g., 0.5 ms, . . . ) can be referred to as a resource block (RB) (e.g., an example is resource block 302, . . . ). The smallest unit of resource can be referred to as a resource element (RE), which can be one subcarrier for a duration of one symbol (e.g., an example is resource element 304 included in resource block 302, . . . ). A resource block can include 84 resource elements for normal CP (or 72 resource elements for extended CP).

In the illustrated example, a first three symbols of subframe 300 extending over the system bandwidth can be included in a control region 306. Further, the remaining eleven symbols of subframe 300 extending over the system bandwidth can be included in a data region 308. As described herein, it is also contemplated that a control region can alternatively include a first symbol of a subframe or a first two symbols of a subframe (e.g., as signaled via a PCFICH sent upon the first symbol of the subframe, . . . ). Yet, the claimed subject matter is not limited to the above examples.

As noted herein, PCFICH, PHICH, and PDCCH can be orthogonal. Accordingly, resource elements in control region 306 respectively reserved for PCFICH, PHICH, and PDCCH can be non-overlapping (e.g., as indicated in physical channel resource allocation 210 of FIG. 2, . . . ). Thus, a first subset of the resource elements in control region 306 can be allocated for PCFICH, a second subset of the resource elements in control region 306 can be allocated for PHICH, and a third subset of the resource elements in control region 306 can be allocated for PDCCH. Moreover, the first subset, the second subset, and the third subset can be non-overlapping.

According to another example, it is contemplated that a subset of the resource elements in data region 308 can be configured for R-PDCCH. The resource elements configured for R-PDCCH can be indicated in physical channel resource allocation 210 of FIG. 2. Yet, it is to be appreciated that the claimed subject matter is not so limited.

Again, reference is made to FIG. 2. Based upon physical channel resource allocation 210, resource mapping component 208 can identify resource elements reserved for the one or more PDCCHs. Further, resource mapping component 208 can utilize at least a subset of the resource elements reserved for the one or more PDCCHs for sending the encoded power control command yielded by command generation component 206. Hence, the encoded power control command can be punctured into a CCE (or more than one CCE) reserved for at least one PDCCH.

By way of example, the resource elements reserved for the one or more PDCCHs may not be fully utilized when a small number of UEs (e.g., UE 204, . . . ) are activated. Accordingly, resource mapping component 208 can use at least a portion of these resource elements reserved for the one or more PDCCHs to send the encoded power control command. However, it is to be appreciated that the claimed subject matter is not limited to the foregoing example.

Moreover, base station 212 can include a resource signaling component 212 that can convey an indicator that identifies that base station 202 sends the power control command through the resource elements reserved for the at least one PDCCH (e.g., rather than sending the power control command as part of a payload of a DCI message carried by a PDCCH, . . . ). By way of example, the indicator yielded by resource signaling component 212 can specify the resource elements reserved for the at least one PDCCH used for sending the power control command to UE 204. Moreover, resource signaling component 212 can convey the indicator through system information, a Physical Broadcast Channel (PBCH), a Primary Synchronization Signal (PSS), a Secondary Synchronization Signal (SSS), a Primary Reference Signal (PRS), a Reference Signal (RS), a combination thereof, and so forth. Accordingly, resource signaling component 212 can notify UE 204 as to a location (e.g., resource elements, punctured within one or more CCEs reserved for at least one PDCCH, . . . ) of the power control command in the control region (or in the data region if resource elements reserved for one or more R-PDCCHs are used for sending the power control command).

UE 204 can identify a physical channel resource allocation 214. For example, UE 204 can detect the number of symbols included in the control region of the subframe based upon the CFI carried by the PCFICH. Additionally or alternatively, resource elements reserved for the PCFICH or the PHICH can be recognized by UE 204 as a function of a cell ID corresponding to base station 202. Moreover, resource elements reserved for the one or more PDCCHs can also be identified by UE 204 (e.g., non-overlapping resource elements compared to the PCFICH and the PHICH as well as reference signals if sent by base station 202, . . . ). Hence, physical channel resource allocation 214 of UE 204 can be substantially similar to physical channel resource allocation 210 of base station 202.

Moreover, UE 204 can include a resource recognition component 216, a command detection component 218, and a power management component 220. Resource recognition component 216 can receive and evaluate the indicator sent by resource signaling component 212 of base station 202. For example, resource recognition component 216 can detect whether base station 202 employs resource elements reserved for the at least one PDCCH for sending the power control command as a function of the indicator. Moreover, resource recognition component 216 can detect the resource elements reserved for the at least one PDCCH used by base station 202 for sending the power control command. Hence, resource recognition component 216 can identify resource elements to be monitored for receipt of the power control command from base station 202 through such signaling of the indicator.

Command detection component 218 can monitor the resource elements reserved for the at least one PDCCH identified by resource recognition component 216 as carrying the power control command sent by base station 202. For example, command detection component 218 can decode the power control command. Further, power management component 220 can adjust a transmit power (e.g., a transmit power spectral density (PSD), . . . ) of UE 204 based upon the power control command. By way of example, power management component 220 can increase, decrease, or maintain the transmit power of UE 204 (e.g., for sending an uplink transmission, . . . ).

According to another example, when resource recognition component 216 detects that base station 202 employs resource elements reserved for the at least one PDCCH for sending the power control command, UE 204 can inhibit monitoring DCI format 3/3A. UE 204 can stop monitoring DCI format 3/3A for group power control based upon the indicator received from base station 202. For instance, the indicator can be received by resource recognition component 216 via reading system information or through other physical channels. Hence, UE 204 (e.g., command detection component 218, . . . ) can monitor the resource elements reserved for the at least one PDCCH, which can be used to carry the power control command, rather than attempting to obtain the power control command via DCI format 3/3A.

Figure 4:
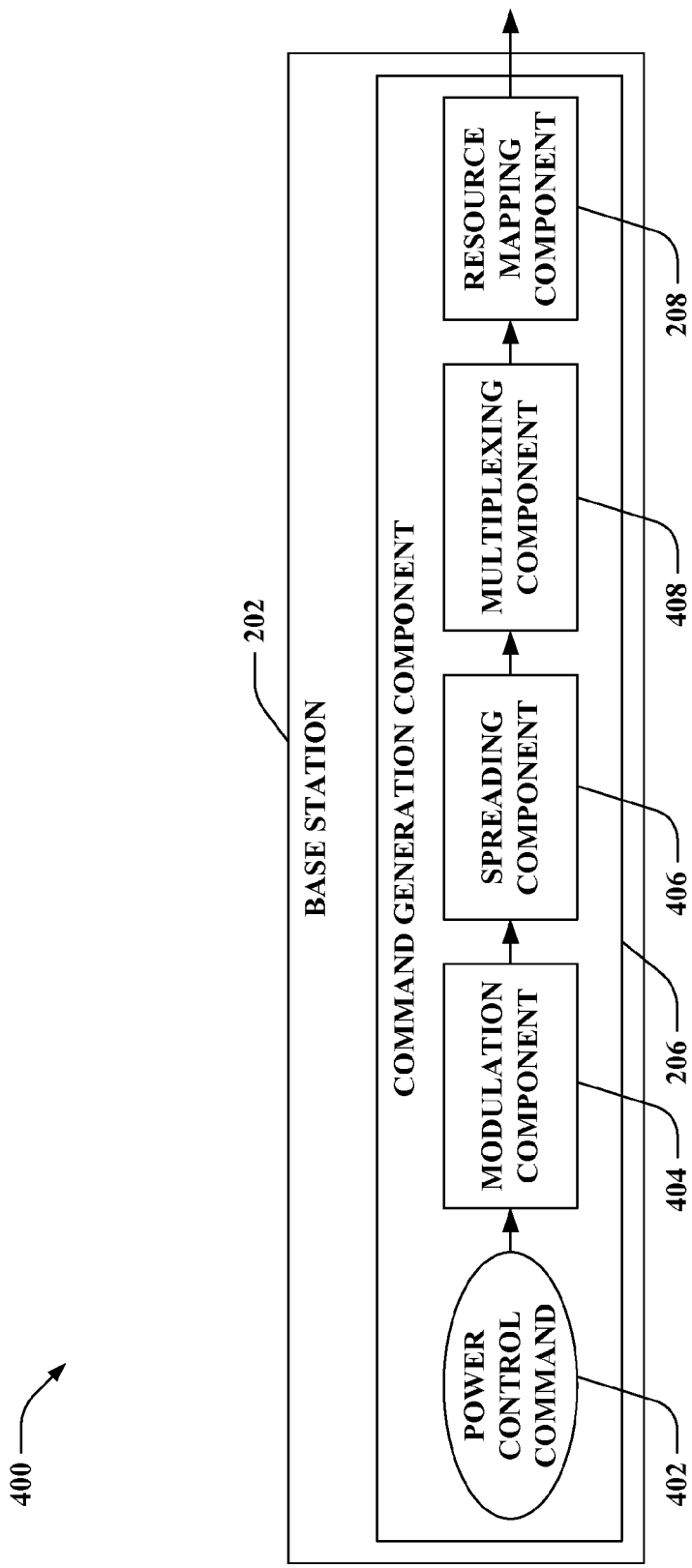
FIG. 4 is an illustration of an example system that transmits a power control command in a wireless communication environment.

Now referring to FIG. 4, illustrated is a system 400 that transmits a power control command in a wireless communication environment. System 400 includes base station 202, which can further include command generation component 206. As described herein, command generation component 206 can include resource mapping component 208. Command generation component 206 can yield a power control command 402. It is to be appreciated that power control command 402 can be represented by one power control command bit, two power control command bits, three power control command bits, or substantially any number of power control command bits.

Command generation component 206 can further include a modulation component 404, a spreading component 406, and a multiplexing component 408. Modulation component 404 can modulate power control command 402 to yield a block of modulated power control command symbols. For example, modulation component 404 can apply binary phase-shift keying (BPSK) modulation to power control command 402. Although not shown, it is further contemplated that command generation component 206 can include a repetition component that can repeat a power control command bit to yield a three bit codeword, which can be modulated by modulation component 404; yet, the claimed subject matter is not so limited.

Multiple power control commands can be mapped to a common set of resource elements. Accordingly, spreading component 406 can use Walsh codes or other orthogonal codes to separate power control commands for different UEs (e.g., UE 204 of FIG. 2, disparate UE(s), . . . ) sharing the common set of resource elements. Spreading component 406 can bit-wise multiply the block of modulated power control command symbols with a Walsh code assigned to a UE to which power control command 402 is being sent. Hence, spreading component 406 can generate a sequence of spread power control command symbols from the bit-wise multiplication of the block of modulated power control command symbols with the Walsh code. By way of an example, one or more Walsh codes can be assigned by base station 202 to a first UE (e.g., UE 204 of FIG. 2, . . . ), while one or more different Walsh codes can be assigned by base station 202 to a second, differing UE. Pursuant to a further example, it is contemplated that spreading component 406 can also bit-wise multiply the block of modulated power control command symbols with a cell-specific scrambling sequence corresponding to base station 202; yet, the claimed subject matter is not so limited.

According to an illustration, a Walsh code used for normal CP can have a length of four (e.g., $[w_0\ w_1\ w_2\ w_3]$, . . . ). Examples of length four Walsh codes can include the following: [+1 +1 +1 +1]; [+1 −1 +1 −1]; [+1 +1 −1 −1]; [+1 −1 −1 +1]; [+j +j +j+j]; [+j −j +j −j]; [+j +j −j −j]; and [+j −j −j +j]. By way of another illustration, a Walsh code used for extended CP can have a length of two (e.g., $[w_0\ w_1]$, . . . ). Examples of length two Walsh codes can include the following: [+1 +1]; [+1 −1]; [+j +j]; and [+j −j]. It is to be appreciated, however, that the claimed subject matter is not limited to the foregoing, and use of any other orthogonal codes is intended to fall within the scope of the hereto appended claims.

Moreover, multiplexing component 408 can combine (e.g., sum, . . . ) sequences of spread power control command symbols respectively generated by spreading component 406 as a function of different Walsh codes (e.g., the sequences can also be a function of differing power control command bits from power control command 402 and/or differing power control command(s), . . . ). Multiplexing component 408 can yield a summed sequence of spread power control command symbols, which can be mapped to resource elements reserved for one or more PDCCHs by resource mapping component 208. According to an example, resource mapping component 208 can map the summed sequence of spread power control command symbols to three clusters of four resource elements; thus, resource mapping component 208 can map the summed sequence of spread power control command symbols to three REGs. The three REGs can be punctured into one or more CCEs reserved for one or more PDCCHs in a control region of a subframe. According to another example, the three REGs can be punctured into resource elements reserved for one or more R-PDCCHs in a data region of a subframe.

As describe herein, base station 202 can reuse a structure similar to a conventional (e.g., Release 8, . . . ) PHICH structure for sending power control commands while using the resource elements reserved for PDCCH. By employing a structure similar to the conventional PHICH structure for sending power control commands, an amount of wasted overhead can be reduced (e.g., as compared to use of DCI format 3/3A when a small number of UEs are activated in a cell, as compared to use of DCI format 0 for sending a power control command without a grant, . . . ). For example, twelve resource elements (e.g., twelve tones, . . . ) can be used for sending a power control command using a structure similar to the conventional PHICH structure while using the resource elements reserved for PDCCH. In contrast, a minimum resolution of a PDCCH can be thirty-six resource elements (e.g., one CCE, thirty-six tones, . . . ); however, more than one CCE can be used for a PDCCH (e.g., one, two, four, or eight CCEs, . . . ).

Figure 5:
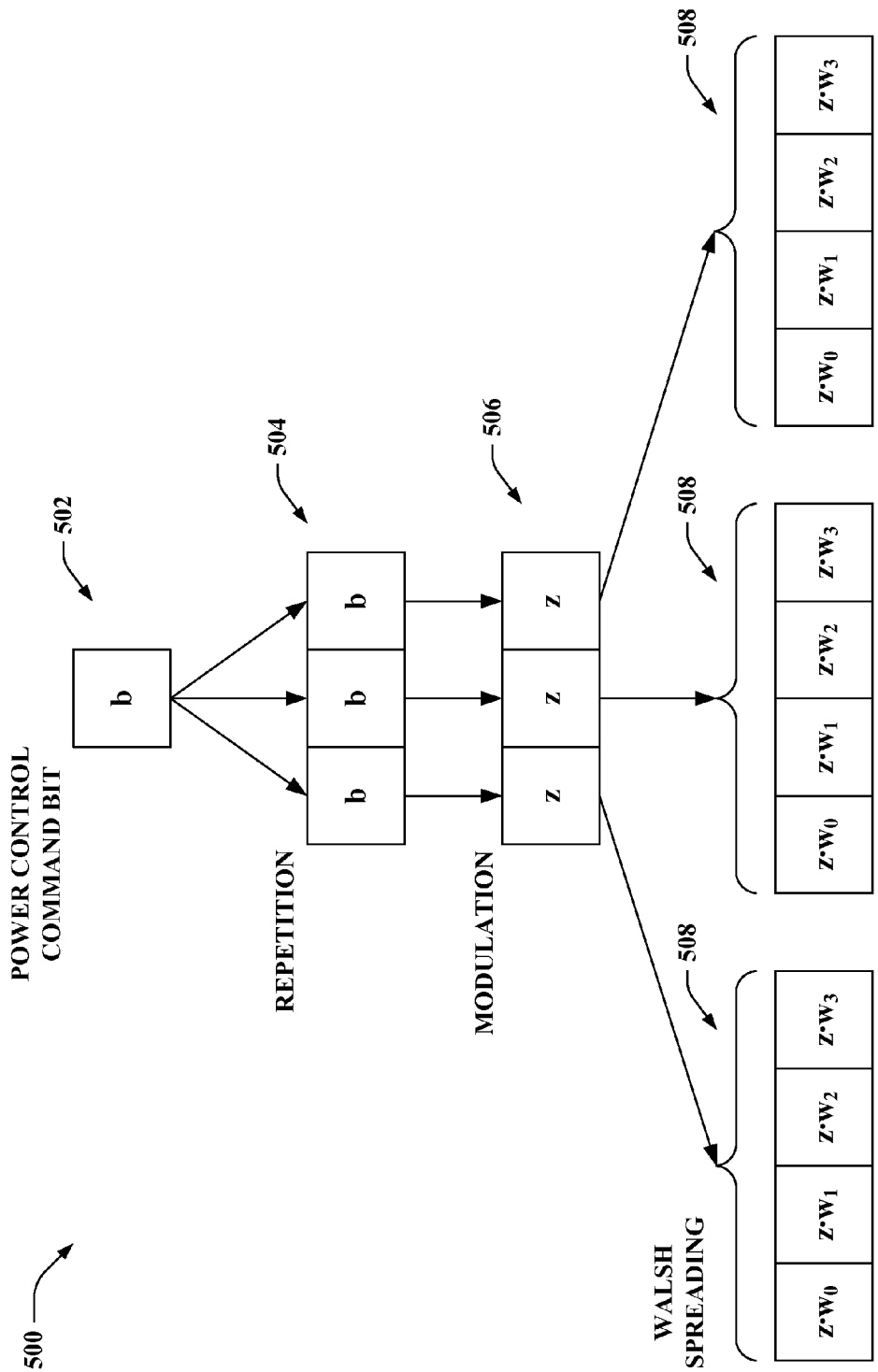
FIGS. 5-7 are illustrations of example power control command signal constructions.
Figure 6:
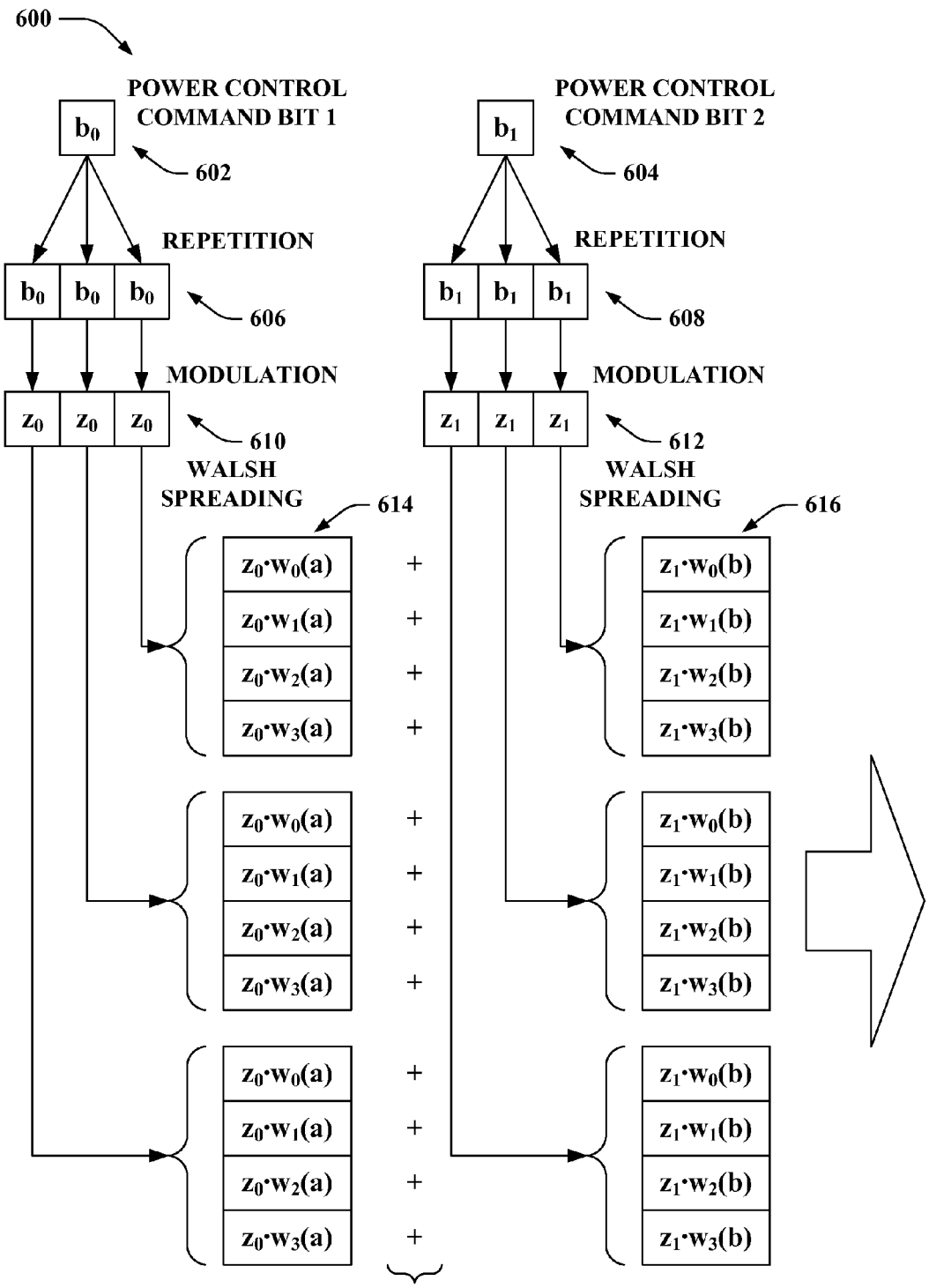
Figure 7:
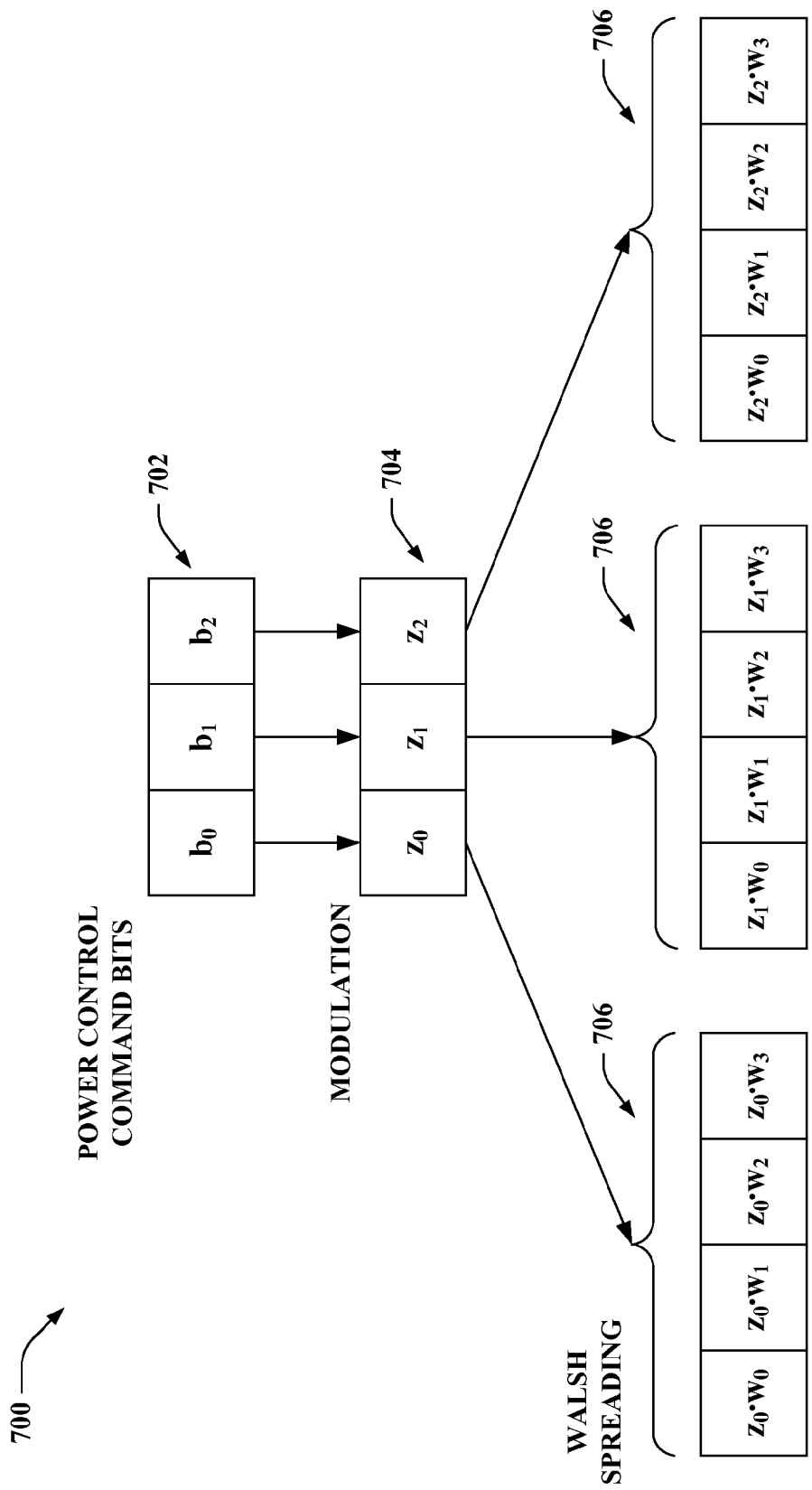

With reference to FIGS. 5-7, illustrated are example power control command signal constructions. These examples are provided to depict various aspects related to generating and sending a power control command. However, it is to be appreciated that the claimed subject matter is not limited to these examples.

Turning to FIG. 5, illustrated is an example power control command signal construction 500. According to an example, a power control command (e.g., power control command 402 of FIG. 4, yielded by command generation component 206 of FIG. 2, . . . ) for a UE (e.g., UE 204 of FIG. 2, . . . ) can be represented by one power control command bit (b) as shown at 502; however, although not shown in power control command signal construction 500, it is to be appreciated that the power control command can be represented by more than one power control command bit (e.g., power control command bit (b) can be one of a plurality of bits representing the power control command for the UE, . . . ). Moreover, the power control command bit (b) can undergo repetition coding to create a three bit power control command codeword (b, b, b) as shown at 504. The three bit power control command codeword (b, b, b) can be modulated (e.g., applying BPSK modulation, by modulation component 404 of FIG. 4, . . . ) to yield a block of modulated power control command symbols (z, z, z) as shown at 506.

Further, Walsh spreading can be applied to the block of modulated power control command symbols (z, z, z) (e.g., by spreading component 406 of FIG. 4, . . . ). According to the depicted example, a length four Walsh code (e.g., $[w_0\ w_1\ w_2\ w_3]$, . . . ) used for normal CP can be leveraged. For instance, the block of modulated power control command symbols (z, z, z) can be bit-wise multiplied by a Walsh code (e.g., $[w_0\ w_1\ w_2\ w_3]$, . . . ) assigned to the UE to which the power control command is being sent to generate a sequence of spread power control command symbols ($z \cdot w_0\ z \cdot w_1\ z \cdot w_2\ z \cdot w_3\ z \cdot w_0$ $z \cdot w_1 \ z \cdot w_2 \ z \cdot w_3 \ z \cdot w_0 \ z \cdot w_1 \ z \cdot w_2 \ z \cdot w_3$), which can include three clusters of four symbols, as shown at 508. Although not shown, it is contemplated that the sequence of spread power control command symbols can be multiplexed (e.g., by multiplexing component 408 of FIG. 4, . . . ) with disparate sequence(s) of spread power control command symbols yielded from respective, disparate Walsh code(s); however, the claimed subject matter is not limited to such multiplexing. Further, the sequence of spread power control command symbols (or the multiplexed sequence that combines the sequence and the disparate sequence(s)) can be mapped to resource elements reserved for at least one PDCCH (e.g., by resource mapping component 208 of FIG. 2, . . . ). For example, the three clusters of symbols can be mapped to three REGs (e.g., three groups of four resource elements, twelve resource elements, . . . ).

Now referring to FIG. 6, illustrated is another example power control command signal construction 600. According to an example, a power control command (e.g., power control command 402 of FIG. 4, yielded by command generation component 206 of FIG. 2, . . . ) for a UE (e.g., UE 204 of FIG. 2, . . . ) can be represented by two power control command bits: namely, a power control command bit 1 ($b_0$) as shown at 602 and a power control command bit 2 ($b_1$) as shown at 604. By way of yet another example, the power control command bit 1 ($b_0$) as shown at 602 can represent a first power control command for a first UE, and the power control command bit 2 ($b_1$) as shown at 604 can represent a second power control command for a second UE.

The power control command bit 1 ($b_0$) can undergo repetition coding to create a three bit power control codeword ($b_0 \ b_0 \ b_0$) as shown at 606, and the power control command bit 2 ($b_1$) can undergo repetition coding to create a three bit power control codeword ($b_1 \ b_1 \ b_1$) as shown at 608. The three bit power control command codewords can be modulated (e.g., applying BPSK modulation, by modulation component 404 of FIG. 4, . . . ) to respectively yield a block of modulated power control command symbols ($z_0 \ z_0 \ z_0$) as shown at 610 and a block of modulated power control command symbols ($z_1 \ z_1 \ z_1$) as shown at 612.

Further, Walsh spreading can be applied to the block of modulated power control command symbols ($z_0 \ z_0 \ z_0$) and the block of modulated power control command symbols ($z_1 \ z_1 \ z_1$) (e.g., by spreading component 406 of FIG. 4, . . . ). According to the depicted example, length four Walsh codes (e.g., [$w_0(a) \ w_1(a) \ w_2(a) \ w_3(a)$], [$w_0(b) \ w_1(b) \ w_2(b) \ w_3(b)$], . . . ) used for normal CP can be leveraged. For instance, the block of modulated power control command symbols ($z_0 \ z_0 \ z_0$) can be bit-wise multiplied by a first Walsh code (e.g., [$w_0(a) \ w_1(a) \ w_2(a) \ w_3(a)$], . . . ) to generate a first sequence of spread power control command symbols, which can include three clusters of four symbols, as shown at 614. Similarly, the block of modulated power control command symbols ($z_1 \ z_1 \ z_1$) can be bit-wise multiplied by a second Walsh code (e.g., [$w_0(b) \ w_1(b) \ w_2(b) \ w_3(b)$], . . . ) to generate a second sequence of spread power control command symbols, which can include three clusters of four symbols, as shown at 616.

By way of example, the first Walsh code (e.g., [$w_0(a) \ w_1(a) \ w_2(a) \ w_3(a)$], . . . ) can be assigned for conveying a first power control command bit ($b_0$) of a power control command to a UE and the second Walsh code (e.g., [$w_0(b) \ w_1(b) \ w_2(b) \ w_3(b)$], . . . ) can be assigned for conveying a second power control command bit ($b_1$) of the power control command to the UE. Following this example, two (or more) Walsh codes can be assigned to the UE to carry more than one power control command bit to the UE. Pursuant to another example, the first Walsh code (e.g., [$w_0(a) \ w_1(a) \ w_2(a) \ w_3(a)$], . . . ) can be assigned for conveying a first power control command bit ($b_0$) of a first power control command to a first UE and the second Walsh code (e.g., [$w_0(b) \ w_1(b) \ w_2(b) \ w_3(b)$], . . . ) can be assigned for conveying a second power control command bit ($b_1$) of a second power control command to a second UE. Thus, power control command bits for the first UE and the second UE that share the same resource elements can be separated by the different Walsh codes.

Moreover, the first sequence of spread power control command symbols and the second sequence of spread power control command symbols can be multiplexed (e.g., by multiplexing component 408 of FIG. 4, . . . ) to yield a multiplexed sequence of spread power control command symbols. For example, the first sequence of spread power control command symbols and the second sequence of spread power control command symbols can be summed. Further, the multiplexed sequence of spread power control command symbols can be mapped to resource elements reserved for at least one PDCCH (e.g., by resource mapping component 208 of FIG. 2, . . . ). For example, the three clusters of symbols can be mapped to three REGs (e.g., three groups of four resource elements, twelve resource elements, . . . ).

With reference to FIG. 7, illustrated is yet another power control command signal construction 700. For example, a power control command (e.g., power control command 402 of FIG. 4, yielded by command generation component 206 of FIG. 2, . . . ) for a UE (e.g., UE 204 of FIG. 2, . . . ) can be represented by three power control command bits ($b_0 \ b_1 \ b_2$) as shown at 702; however, it is to be appreciated that the claimed subject matter contemplates representing a power control command with substantially any number of bits. The three power control command bits ($b_0 \ b_1 \ b_2$) can be modulated (e.g., applying BPSK modulation, by modulation component 404 of FIG. 4, . . . ) to yield a block of modulated power control command symbols ($z_0, z_1, z_2$) as shown at 704.

Further, Walsh spreading can be applied to the block of modulated power control command symbols ($z_0, z_1, z_2$) (e.g., by spreading component 406 of FIG. 4, . . . ). According to the depicted example, a length four Walsh code (e.g., [$w_0 \ w_1 \ w_2 \ w_3$], . . . ) used for normal CP can be leveraged. For instance, the block of modulated power control command symbols ($z_0, z_1, z_2$) can be bit-wise multiplied by a Walsh code (e.g., [$w_0 \ w_1 \ w_2 \ w_3$], . . . ) assigned to the UE to which the power control command is being sent to generate a sequence of spread power control command symbols ($z_0 \cdot w_0 \ z_0 \cdot w_1 \ z_0 \cdot w_2 \ z_0 \cdot w_3 \ z_1 \cdot w_0 \ z_1 \cdot w_1 \ z_1 \cdot w_2 \ z_1 \cdot w_3 \ z_2 \cdot w_0 \ z_2 \cdot w_1 \ z_2 \cdot w_2 \ z_2 \cdot w_3$), which can include three clusters of four symbols, as shown at 706. Although not shown, it is contemplated that the sequence of spread power control command symbols can be multiplexed (e.g., by multiplexing component 408 of FIG. 4, . . . ) with disparate sequence(s) of spread power control command symbols yielded from respective, disparate Walsh code(s); however, the claimed subject matter is not limited to such multiplexing. Further, the sequence of spread power control command symbols (or the multiplexed sequence that combines the sequence and the disparate sequence(s)) can be mapped to resource elements reserved for at least one PDCCH (e.g., by resource mapping component 208 of FIG. 2, . . . ). For example, the three clusters of symbols can be mapped to three REGs (e.g., three groups of four resource elements, twelve resource elements, . . . ).

Figure 8:
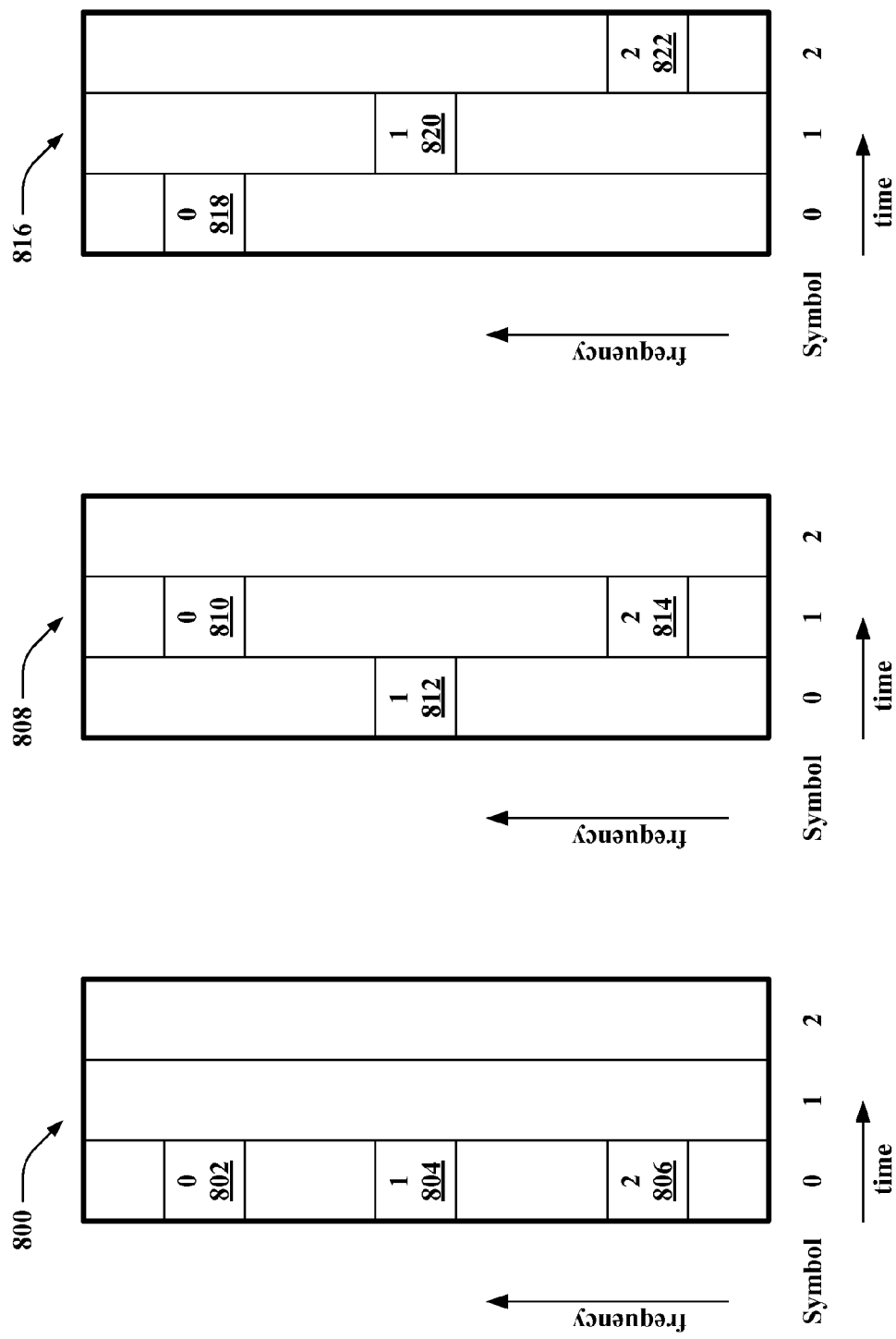
FIG. 8 is an illustration of example mappings of a power control command to one or more symbols (e.g., OFDM symbols, . . . ) in a control region of a subframe.

Now turning to FIG. 8, illustrated are example mappings of a power control command to one or more symbols (e.g., OFDM symbols, . . . ) in a control region of a subframe. For example, the control region of the subframe can include one, two, or three symbols (e.g., as specified by PCFICH, . . . ). As described herein, three clusters of four symbols carrying encoded bit(s) of power control command(s) can be mapped to three REGs; the three REGs can be distributed in a time domain and/or a frequency domain.

As depicted by mapping 800, the three REGs (REG 0 802, REG 1 804, and REG 2 806) can be transmitted on a first symbol of the subframe. With mapping 808, the three REGs can be transmitted on a first two symbols of the subframe. According to the depicted example, REG 0 810 can be transmitted on a second symbol of the subframe (symbol 1), REG 1 812 can be transmitted on a first symbol of the subframe (symbol 0), and REG 2 814 can be transmitted on the second symbol of the subframe (symbol 1). Moreover, mapping 808 can be employed when the control region of the subframe includes two or more symbols. Moreover, mapping 816 can transmit the three REGs on a first three symbols of the subframe. Pursuant to an example, REG 0 818 can be transmitted on a first symbol of the subframe (symbol 0), REG 1 820 can be transmitted on a second symbol of the subframe (symbol 1), and REG 2 822 can be transmitted on a third symbol of the subframe (symbol 2). Further, mapping 816 can be utilized when the control region of the subframe includes three symbols.

It is to be appreciated, however, that the claimed subject matter is not limited to sending the REGs as part of the control region. For instance, it is contemplated that the three REGs can be sent in a data region of a subframe using resource elements reserved for one or more R-PDCCHs. Thus, power control command bit(s) can be punctured into resource elements reserved for one or more R-PDCCHs.

Figure 9:
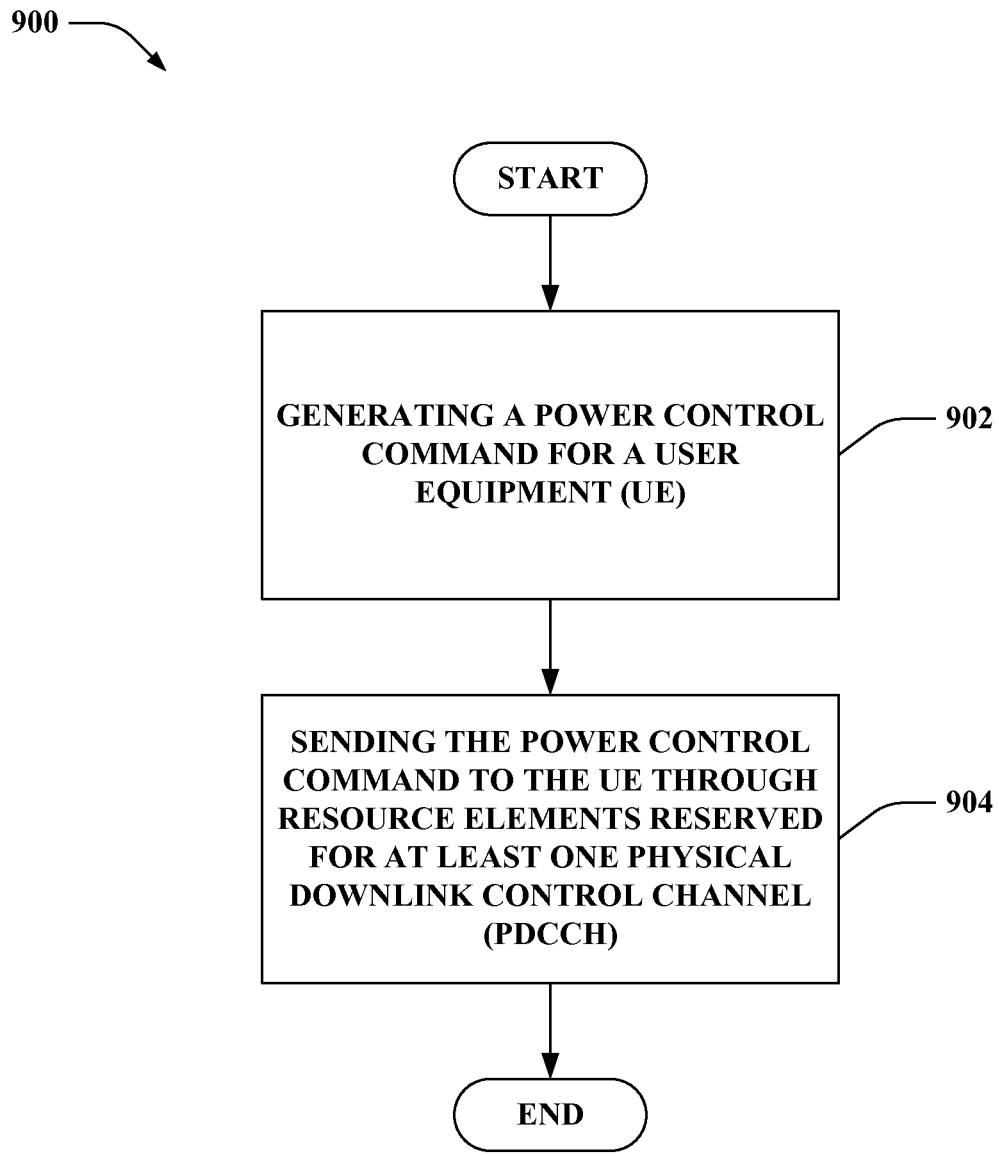
FIG. 9 is an illustration of an example methodology that facilitates controlling uplink power in a wireless communication environment.
Figure 10:
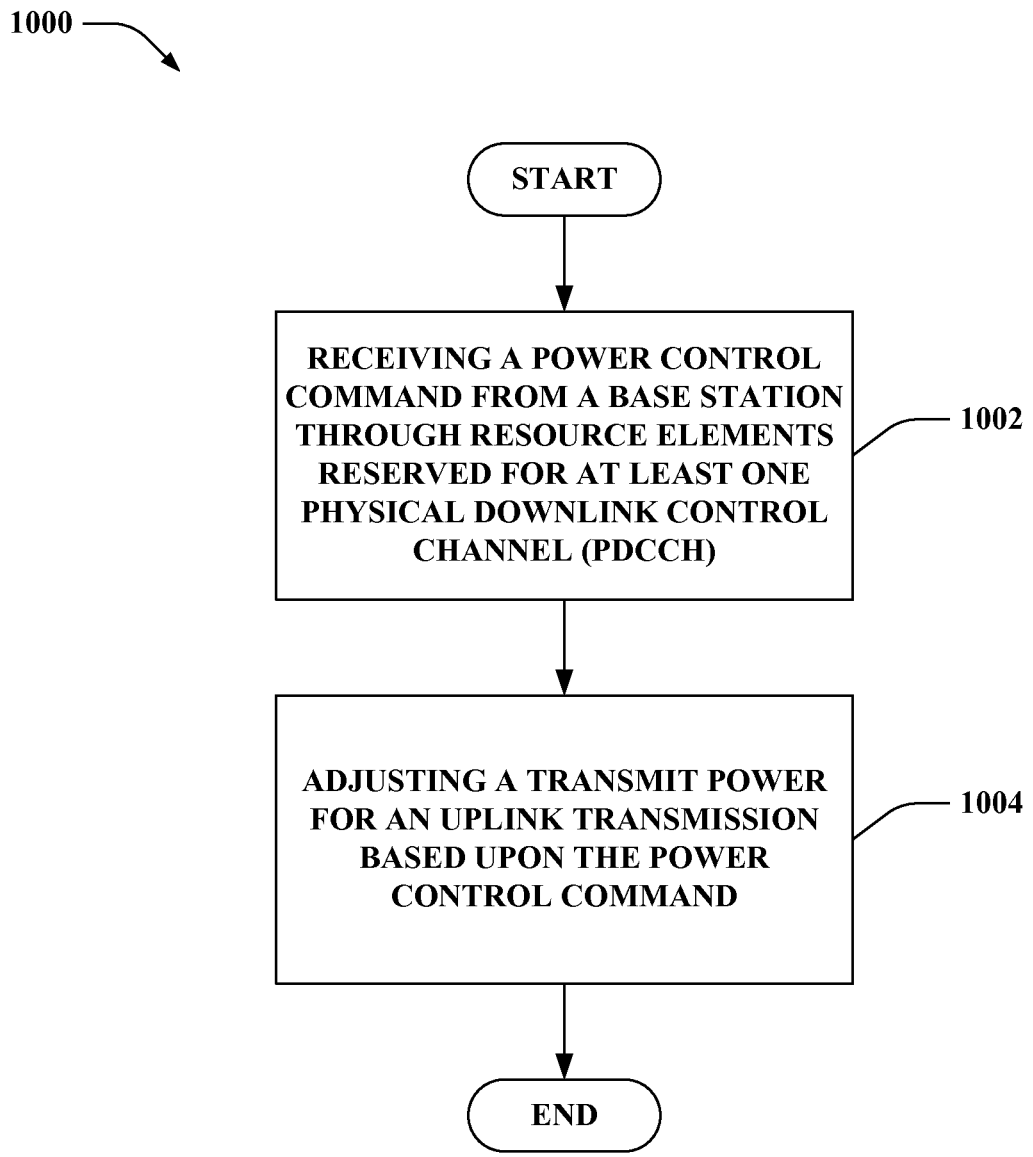
FIG. 10 is an illustration of an example methodology that facilitates altering an uplink transmit power in a wireless communication environment.

Referring to FIGS. 9-10, methodologies relating to controlling uplink power in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 9, illustrated is a methodology 900 that facilitates controlling uplink power in a wireless communication environment. At 902, a power control command for a user equipment (UE) can be generated. For instance, the power control command can include substantially any number of power control command bits (e.g., one power control command bit, two power control command bits, three power control command bits, . . . ). Moreover, the power control command can cause the UE to increase, decrease, or maintain a transmit power for sending an uplink transmission. For example, it is further contemplated that power control command(s) can also respectively be generated for differing UE(s).

At 904, the power control command can be sent to the UE through resource elements reserved for at least one Physical Downlink Control Channel (PDCCH). Further, the power control command can be mapped to the resource elements reserved for the at least one PDCCH. For instance, the power control command can be punctured into a control channel element (CCE) reserved for the at least one PDCCH. According to an example, an indicator that specifies the resource elements reserved for the at least one PDCCH used for sending the power control command to the UE can be conveyed. Following this example, the indicator can be conveyed through system information, a Physical Broadcast Channel (PBCH), a Primary Synchronization Signal (PSS), a Secondary Synchronization Signal (SSS), a Primary Reference Signal (PRS), a Reference Signal (RS), a combination thereof, and so forth.

By way of example, the resource elements reserved for the at least one PDCCH can be within a control region of a subframe. Pursuant to another example, the resource elements for the at least one PDCCH can be within a data region of a subframe, and the at least one PDCCH can be at least one Relay-PDCCH (R-PDCCH).

According to a further example, the power control command can be spread using a Walsh code (or any other orthogonal code) assigned to the UE. Thus, a structure similar to a conventional (e.g., Release 8, . . . ) PHICH structure can be utilized for sending the power control command to the UE through the resource elements reserved for the at least one PDCCH. In accordance with an example, a first bit of the power control command can be separated from a second bit of the power control command sent through the resource elements reserved for the at least one PDCCH utilizing differing Walsh codes assigned to the UE (e.g., a first Walsh code can be applied to the first bit of the power control command and a second Walsh code can be applied to the second bit of the power control command, . . . ). According to another example, the power control command for the UE can be separated from a disparate power control command for a disparate UE sent through the resource elements reserved for the at least one PDCCH. Following this example, the disparate power control command can be spread using a disparate Walsh code assigned to the disparate UE.

Turning to FIG. 10, illustrated is a methodology 1000 that facilitates altering an uplink transmit power in a wireless communication environment. At 1002, a power control command can be received from a base station through resource elements reserved for at least one Physical Downlink Control Channel (PDCCH). Thus, the power control command can be punctured into a control channel element (CCE) reserved for the at least one PDCCH, rather than receiving a power control command as part of a payload of a downlink control information (DCI) message carried upon one or more of the at least one PDCCH. For example, an indicator can be received from the base station, where the indicator can specify the resource elements reserved for the at least one PDCCH used by the base station for sending the power control command. Further, the indicator can be received through system information, a Physical Broadcast Channel (PBCH), a Primary Synchronization Signal (PSS), a Secondary Synchronization Signal (SSS), a Primary Reference Signal (PRS), or a Reference Signal (RS), a combination thereof, and the like. Moreover, based upon receipt of the indicator that specifies the resource elements reserved for the at least one PDCCH used by the base station for sending the power control command, monitoring of DCI format 3/3A can be inhibited. Further, the power control command can be detected utilizing one or more Walsh codes assigned to a user equipment (UE) by the base station. By way of example, the resource elements reserved for the at least one PDCCH can be within a control region of a subframe. Pursuant to another example, the resource elements for the at least one PDCCH can be within a data region of a subframe, and the at least one PDCCH can be at least one Relay-PDCCH (R-PDCCH). At 1004, a transmit power for an uplink transmission can be adjusted based upon the power control command. For instance, the transmit power can be increased, decreased, or maintained based upon the power control command.

It will be appreciated that, in accordance with one or more aspects described herein, inferences can be made pertaining to sending power control commands in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 11:
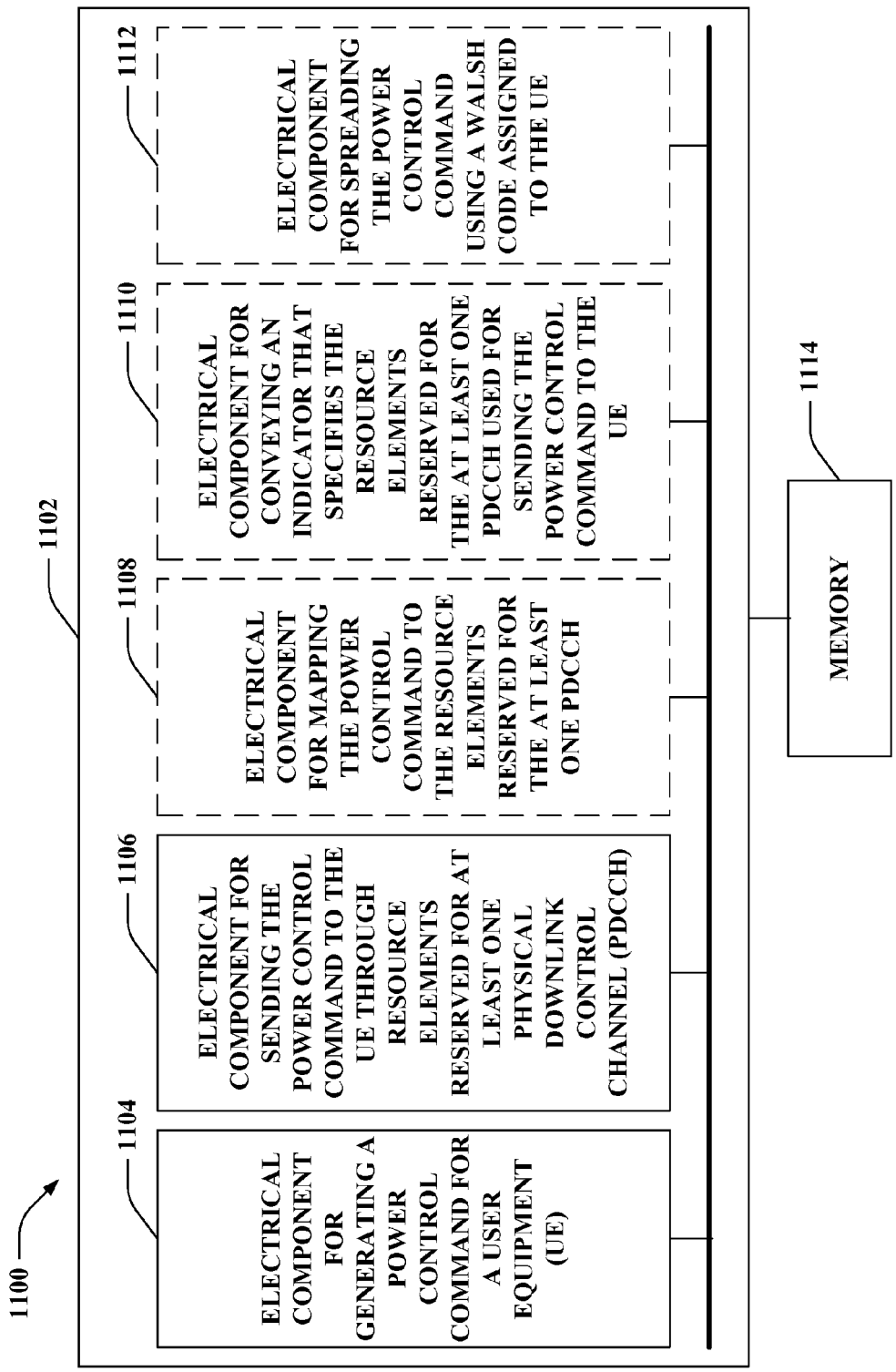
FIG. 11 is an illustration of an example system that enables controlling uplink power in a wireless communication environment.

With reference to FIG. 11, illustrated is a system 1100 that enables controlling uplink power in a wireless communication environment. For example, system 1100 can reside at least partially within a base station. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for generating a power control command for a user equipment (UE) 1104. Further, logical grouping 1102 can include an electrical component for sending the power control command to the UE through resource elements reserved for at least one Physical Downlink Control Channel (PDCCH) 1106. Logical grouping 1102 can also optionally include an electrical component for mapping the power control command to the resource elements reserved for the at least one PDCCH 1108. Moreover, logical grouping 1102 can optionally include an electrical component for conveying an indicator that specifies the resource elements reserved for the at least one PDCCH used for sending the power control command to the UE 1110. Additionally, logical grouping 1102 can optionally include an electrical component for spreading the power control command using a Walsh code assigned to the UE 1112. Additionally, system 1100 can include a memory 1114 that retains instructions for executing functions associated with electrical components 1104, 1106, 1108, 1110, and 1112. While shown as being external to memory 1114, it is to be understood that one or more of electrical components 1104, 1106, 1108, 1110, and 1112 can exist within memory 1114.

Figure 12:
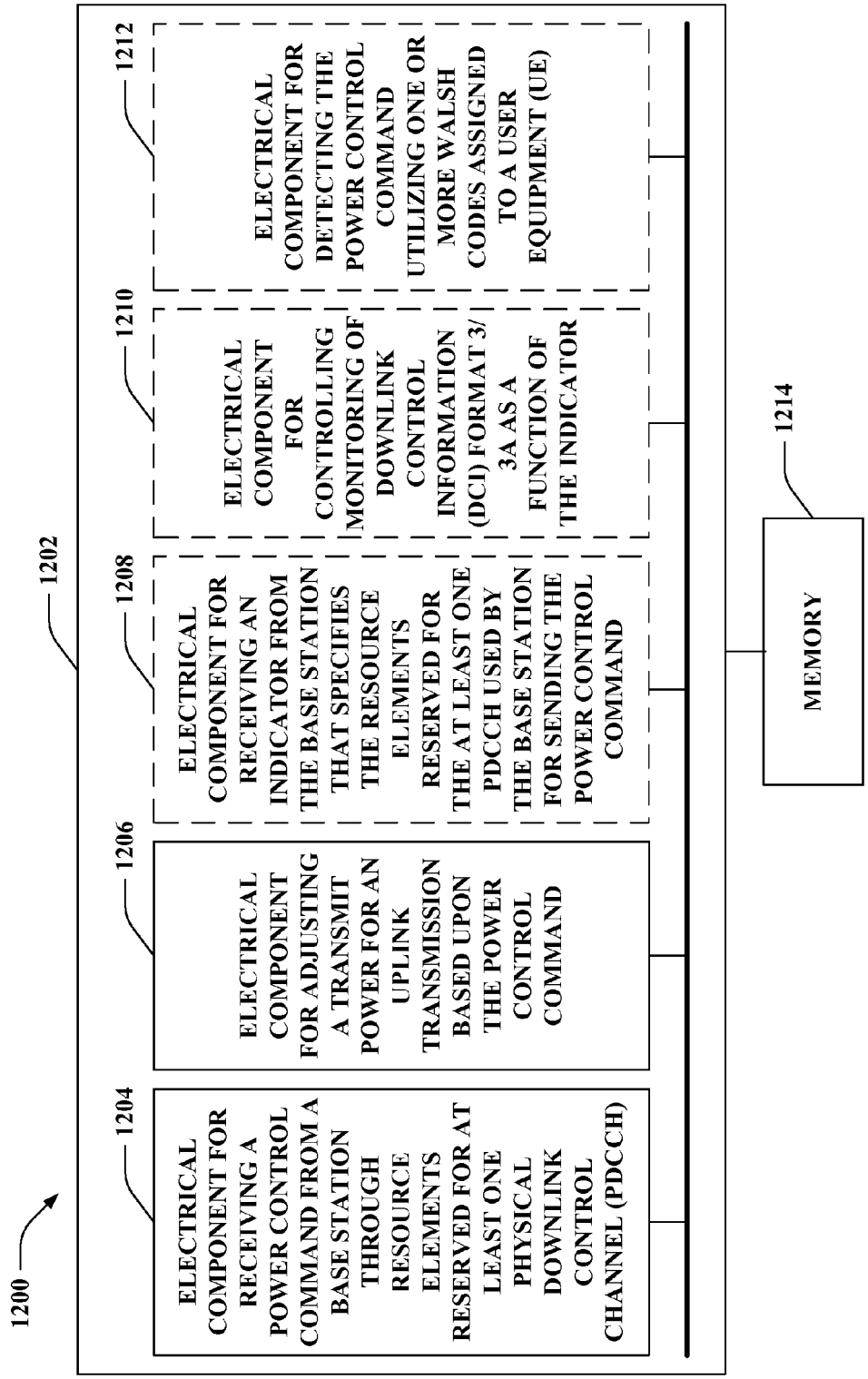
FIG. 12 is an illustration of an example system that enables managing uplink power in a wireless communication environment.

With reference to FIG. 12, illustrated is a system 1200 that enables managing uplink power in a wireless communication environment. For example, system 1200 can reside within a UE. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for receiving a power control command from a base station through resource elements reserved for at least one Physical Downlink Control Channel (PDCCH) 1204. Moreover, logical grouping 1202 can include an electrical component for adjusting a transmit power for an uplink transmission based upon the power control command 1206. Further, logical grouping 1202 can optionally include an electrical component for receiving an indicator from the base station that specifies the resource elements reserved for the at least one PDCCH used by the base station for sending the power control command 1208. Logical grouping 1202 can also optionally include an electrical component for controlling monitoring of downlink control information (DCI) format 3/3A as a function of the indicator 1210. Additionally, logical grouping 1202 can optionally include an electrical component for recognizing the power control command utilizing one or more Walsh codes assigned to a user equipment (UE) 1212. Additionally, system 1200 can include a memory 1214 that retains instructions for executing functions associated with electrical components 1204, 1206, 1208, 1210, and 1212. While shown as being external to memory 1214, it is to be understood that one or more of electrical components 1204, 1206, 1208, 1210, and 1212 can exist within memory 1214.

Figure 13:
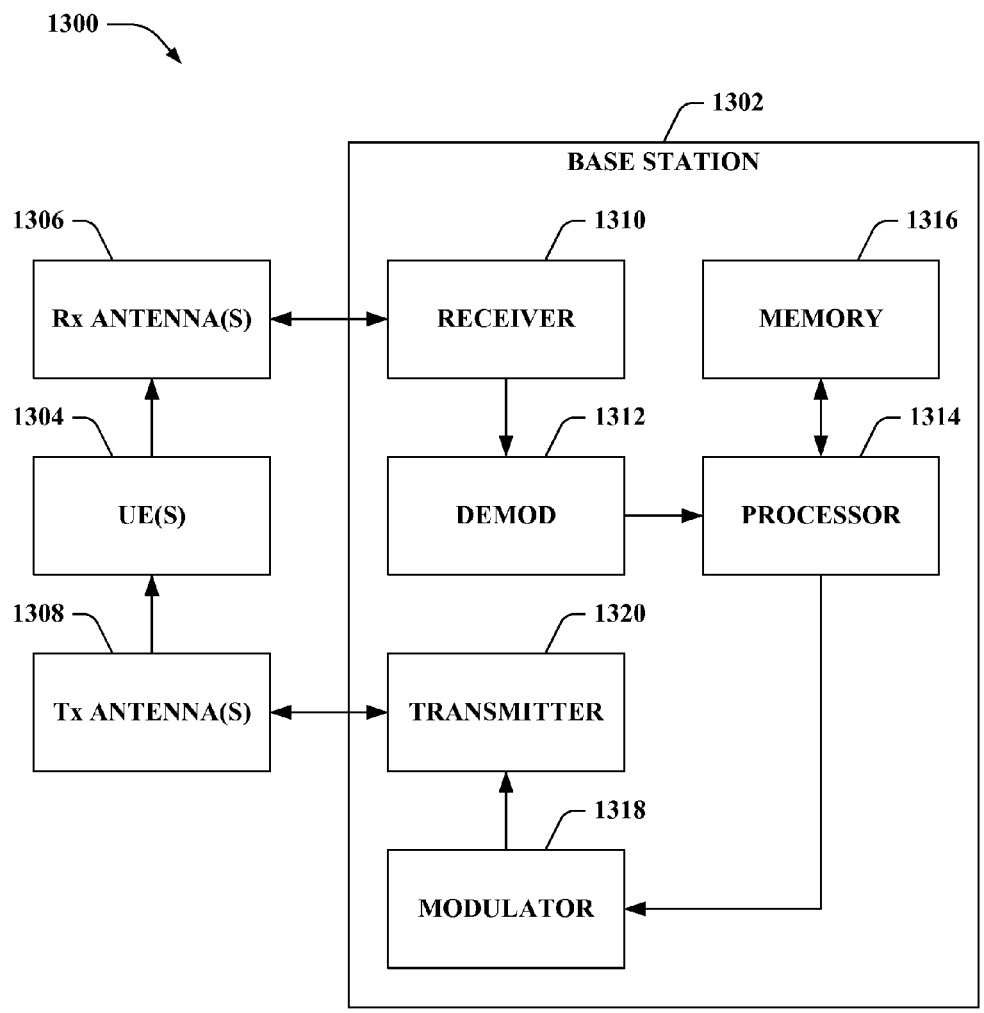
FIGS. 13-14 are illustrations of example systems that can be utilized to implement various aspects of the functionality described herein.

FIG. 13 is an illustration of a system 1300 that can be utilized to implement various aspects of the functionality described herein. System 1300 can include a base station 1302 (e.g., base station 202, . . . ). Base station 1302 can receive signal(s) from one or more UEs 1304 via one or more receive (Rx) antennas 1306 and transmit to the one or more UEs 1304 via one or more transmit (Tx) antennas 1308. Further, base station 1302 can include a receiver 1310 that receives information from receive antenna(s) 1306. According to an example, receiver 1310 can be operatively associated with a demodulator (demod) 1312 that demodulates received information. Demodulated symbols can be analyzed by a processor 1314. Processor 1314 can be coupled to memory 1316, which can store data to be transmitted to or received from UE(s) 1304 and/or any other suitable protocols, algorithms, information, etc. related to performing the various actions and functions set forth herein. For example, base station 1302 can employ processor 1314 to perform methodology 900 and/or other similar and appropriate methodologies. Base station 1302 can further include a modulator 1318 that can multiplex a signal for transmission by a transmitter 1320 through antenna(s) 1308.

Processor 1314 can be a processor dedicated to analyzing information received by receiver 1310, dedicated to generating information for transmission by transmitter 1320, or dedicated to controlling one or more components of base station 1302. According to another example, processor 1314 can analyze information received by receiver 1310, generate information for transmission by transmitter 1320, and control one or more components of base station 1302. The one or more components of base station 1302 can include, for example, command generation component 206, resource mapping component 208, resource signaling component 212, modulation component 404, spreading component 406, and/or multiplexing component 408. Moreover, although not shown, it is contemplated that the one or more components of base station 1302 can be part of processor 1314 or a plurality of processors (not shown).

Figure 14:
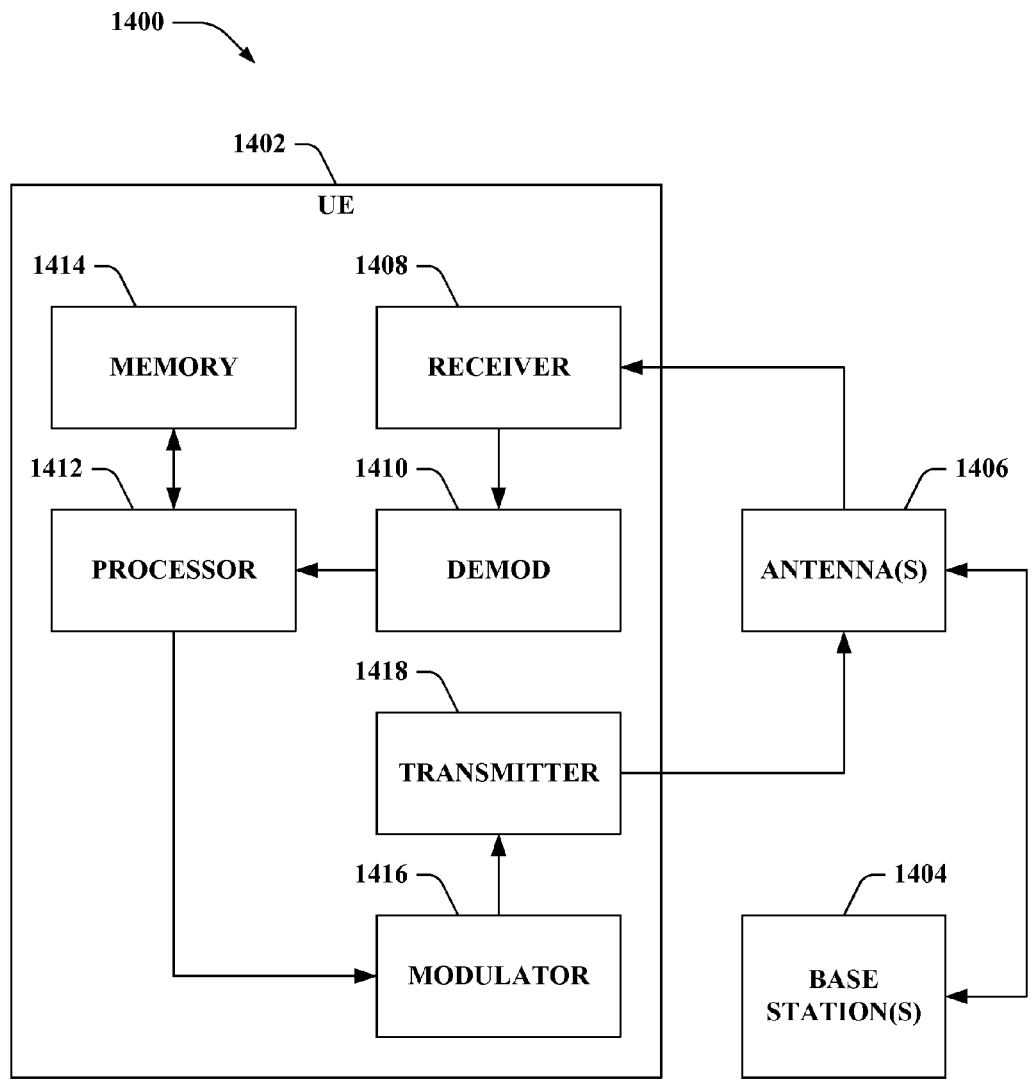

FIG. 14 is an illustration of a system 1400 that can be utilized to implement various aspects of the functionality described herein. System 1400 can include a UE 1402 (e.g., UE 204, . . . ). UE 1402 can receive signal(s) from one or more base stations 1404 and/or transmit to one or more base stations 1404 via one or more antennas 1406. Further, UE 1402 can include a receiver 1408 that receives information from antenna(s) 1406. According to an example, receiver 1408 can be operatively associated with a demodulator (demod) 1410 that demodulates received information. Demodulated symbols can be analyzed by a processor 1412. Processor 1412 can be coupled to memory 1414, which can store data to be transmitted to or received from base station(s) 1404 and/or any other suitable protocols, algorithms, information, etc. related to performing the various actions and functions set forth herein. For example, UE 1402 can employ processor 1412 to perform methodology 1000 and/or other similar and appropriate methodologies. UE 1402 can further include a modulator 1416 that can multiplex a signal for transmission by a transmitter 1418 through antenna(s) 1406.

Processor 1412 can be a processor dedicated to analyzing information received by receiver 1408, dedicated to generating information for transmission by transmitter 1418, or dedicated to controlling one or more components of UE 1402. According to another example, processor 1412 can analyze information received by receiver 1408, generate information for transmission by transmitter 1418, and control one or more components of UE 1402. The one or more components of UE 1402 can include, for example, resource recognition component 216, command detection component 218, and/or a power management component 220. Moreover, although not shown, it is contemplated that the one or more components of UE 1402 can be part of processor 1412 or a plurality of processors (not shown).

Figure 15:
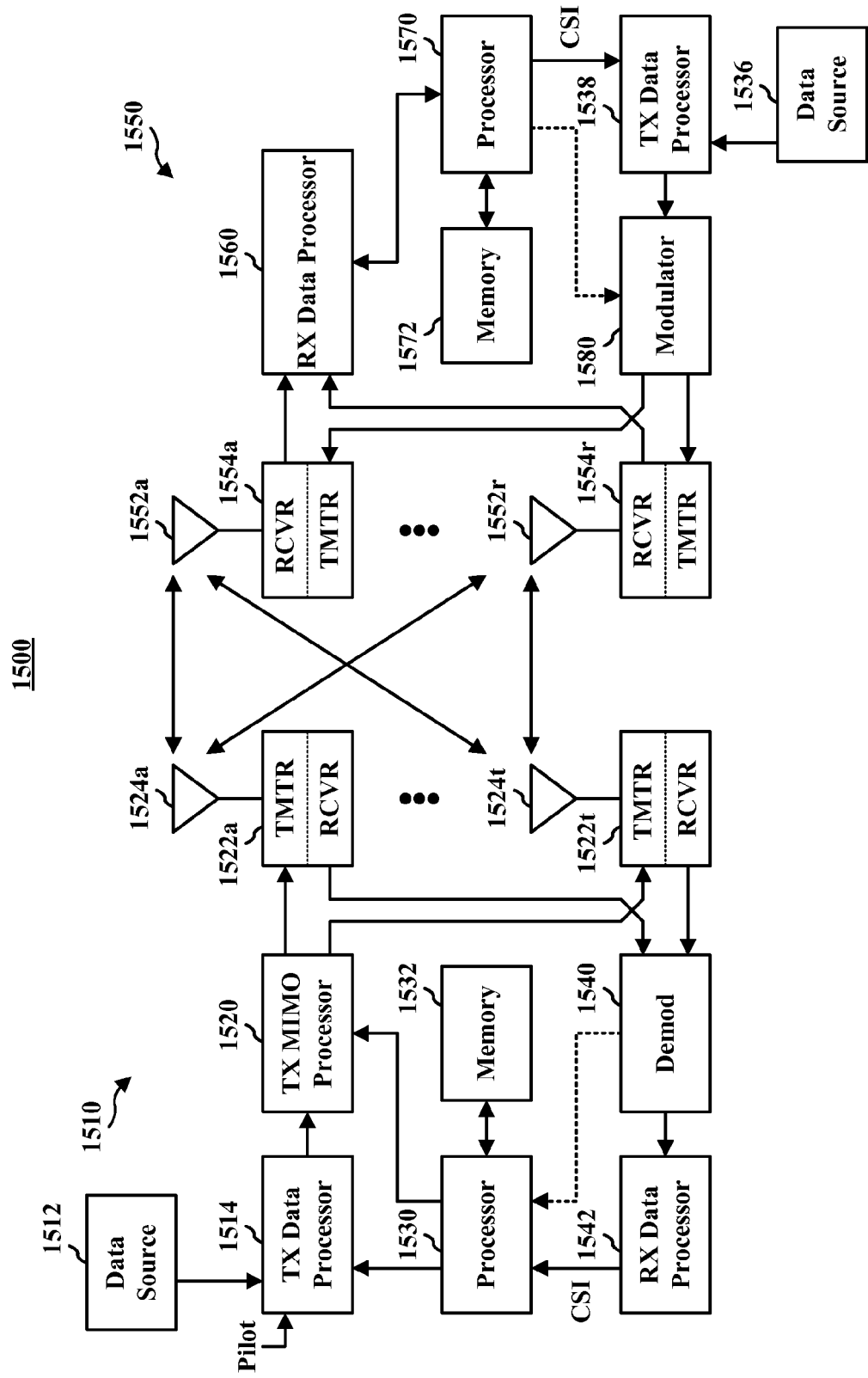
FIG. 15 is an illustration of an example wireless communication system that can be employed in conjunction with the various systems and methods described herein.

FIG. 15 shows an example wireless communication system 1500. Wireless communication system 1500 depicts one base station 1510 and one UE 1550 for sake of brevity. However, it is to be appreciated that system 1500 can include more than one base station and/or more than one UE, wherein additional base stations and/or UEs can be substantially similar or different from example base station 1510 and UE 1550 described below. In addition, it is to be appreciated that base station 1510 and/or UE 1550 can employ the systems (FIGS. 1-2, 4 and 11-14) and/or methods (FIGS. 9-10) described herein to facilitate wireless communication there between.

At base station 1510, traffic data for a number of data streams is provided from a data source 1512 to a transmit (TX) data processor 1514. According to an example, each data stream can be transmitted over a respective antenna. TX data processor 1514 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at UE 1550 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1530.

The modulation symbols for the data streams can be provided to a TX MIMO processor 1520, which can further process the modulation symbols (e.g., for OFDM). TX MIMO processor 1520 then provides $N_T$ modulation symbol streams to $N_T$ transmitters (TMTR) 1522a through 1522t. In various embodiments, TX MIMO processor 1520 applies beamforming weights to the symbols of the data streams and to the antenna from which the symbol is being transmitted.

Each transmitter 1522 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1522a through 1522t are transmitted from $N_T$ antennas 1524a through 1524t, respectively.

At UE 1550, the transmitted modulated signals are received by $N_R$ antennas 1552a through 1552r and the received signal from each antenna 1552 is provided to a respective receiver (RCVR) 1554a through 1554r. Each receiver 1554 conditions (e.g., filters, amplifies, and downconverts) a respective signal, digitizes the conditioned signal to provide samples, and further processes the samples to provide a corresponding "received" symbol stream.

An RX data processor 1560 can receive and process the $N_R$ received symbol streams from $N_R$ receivers 1554 based on a particular receiver processing technique to provide $N_T$ "detected" symbol streams. RX data processor 1560 can demodulate, deinterleave, and decode each detected symbol stream to recover the traffic data for the data stream. The processing by RX data processor 1560 is complementary to that performed by TX MIMO processor 1520 and TX data processor 1514 at base station 1510.

A processor 1570 can periodically determine which available technology to utilize as discussed above. Further, processor 1570 can formulate a reverse link message comprising a matrix index portion and a rank value portion.

The reverse link message can comprise various types of information regarding the communication link and/or the received data stream. The reverse link message can be processed by a TX data processor 1538, which also receives traffic data for a number of data streams from a data source 1536, modulated by a modulator 1580, conditioned by transmitters 1554a through 1554r, and transmitted back to base station 1510.

At base station 1510, the modulated signals from UE 1550 are received by antennas 1524, conditioned by receivers 1522, demodulated by a demodulator 1540, and processed by a RX data processor 1542 to extract the reverse link message transmitted by UE 1550. Further, processor 1530 can process the extracted message to determine which precoding matrix to use for determining the beamforming weights.

Processors 1530 and 1570 can direct (e.g., control, coordinate, manage, etc.) operation at base station 1510 and UE 1550, respectively. Respective processors 1530 and 1570 can be associated with memory 1532 and 1572 that store program codes and data. Processors 1530 and 1570 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates controlling uplink power in a wireless communication environment, comprising:
    generating a power control command for a user equipment (UE);
    mapping the power control command to reserved resource elements in at least one Physical Downlink Control Channel (PDCCH), wherein the reserved resource elements do not overlap other types of downlink control channels, and the mapping of the power control command is based on a physical channel resource allocation of resource elements within a subframe that are reserved for the at least one PDCCH;
    sending the power control command to the UE through resource elements reserved for the at least one PDCCH; and
    conveying an indicator that specifies the resource elements reserved for the at least one PDCCH used for sending the power control command to the UE.

2. The method of claim 1, further comprising conveying the indicator through at least one of system information, a Physical Broadcast Channel (PBCH), a Primary Synchronization Signal (PSS), a Secondary Synchronization Signal (SSS), a Primary Reference Signal (PRS), or a Reference Signal (RS).

3. The method of claim 1, wherein the power control command is punctured into a control channel element (CCE) reserved for the at least one PDCCH.

4. The method of claim 1, wherein the at least one PDCCH is at least one Relay-PDCCH (R-PDCCH).

5. The method of claim 1, further comprising spreading the power control command using a Walsh code assigned to the UE.

6. The method of claim 5, further comprising separating a first bit of the power control command from a second bit of the power control command sent through the resource elements reserved for the at least one PDCCH utilizing differing Walsh codes assigned to the UE.

7. The method of claim 5, wherein the power control command for the UE is separated from a disparate power control command for a disparate UE sent through the resource elements reserved for the at least one PDCCH, the disparate power control command being spread using a disparate Walsh code assigned to the disparate UE.

8. A wireless communications apparatus, comprising:
    a memory that retains instructions related to generating a power control command for a user equipment (UE),
    mapping the power control command to reserved resource elements in at least one Physical Downlink Control Channel (PDCCH), wherein the reserved resource elements do not overlap other types of downlink control channels, and the mapping of the power control command is based on a physical channel resource allocation of resource elements within a subframe that are reserved for the at least one PDCCH,
    sending the power control command to the UE through the resource elements reserved for the at least one PDCCH, and
    conveying an indicator that specifies the resource elements reserved for the at least one PDCCH used for sending the power control command to the UE; and
    a processor, coupled to the memory, configured to execute the instructions retained in the memory.

9. The wireless communications apparatus of claim 8, wherein the memory further retains instructions related to conveying the indicator through at least one of system information, a Physical Broadcast Channel (PBCH), a Primary Synchronization Signal (PSS), a Secondary Synchronization Signal (SSS), a Primary Reference Signal (PRS), or a Reference Signal (RS).

10. The wireless communications apparatus of claim 8, wherein the memory further retains instructions related to spreading the power control command using a Walsh code assigned to the UE.

11. The wireless communications apparatus of claim 10, wherein the memory further retains instructions related to separating a first bit of the power control command from a second bit of the power control command sent through the resource elements reserved for the at least one PDCCH utilizing differing Walsh codes assigned to the UE.

12. The wireless communications apparatus of claim 10, wherein the power control command for the UE is separated from a disparate power control command for a disparate UE sent through the resource elements reserved for the at least one PDCCH, the disparate power control command being spread using a disparate Walsh code assigned to the disparate UE.

13. A wireless communications apparatus that enables controlling uplink power in a wireless communication environment, comprising:
    means for generating a power control command for a user equipment (UE);
    means for mapping the power control command to reserved resource elements in at least one Physical Downlink Control Channel (PDCCH), wherein the reserved resource elements do not overlap other types of downlink control channels, and the mapping of the power control command is based on a physical channel resource allocation of resource elements within a subframe that are reserved for the at least one PDCCH;
    means for sending the power control command to the UE through resource elements reserved for the at least one PDCCH; and
    means for conveying an indicator that specifies the resource elements reserved for the at least one PDCCH used for sending the power control command to the UE.

14. The wireless communications apparatus of claim 13, further comprising means for spreading the power control command using a Walsh code assigned to the UE.

15. The wireless communications apparatus of claim 13, wherein the power control command is punctured into a control channel element (CCE) reserved for the at least one PDCCH.

16. A computer program product, comprising:
a non-transitory computer-readable medium comprising:
  code for generating a power control command for a user equipment (UE);
  code for mapping the power control command to reserved resource elements in at least one Physical Downlink Control Channel (PDCCH), wherein the reserved resource elements do not overlap other types of downlink control channels, and the mapping of the power control command is based on a physical channel resource allocation of resource elements within a subframe that are reserved for the at least one PDCCH;
  code for sending the power control command to the UE through resource elements reserved for the at least one PDCCH; and
  code for conveying an indicator that specifies the resource elements reserved for the at least one PDCCH used for sending the power control command to the UE.

17. The computer program product of claim 16, wherein the computer-readable medium further comprises code for spreading the power control command using a Walsh code assigned to the UE.

18. The computer program product of claim 16, wherein the power control command is punctured into a control channel element (CCE) reserved for the at least one PDCCH.

19. A wireless communications apparatus, comprising:
a processor configured to:
  generate a power control command for a user equipment (UE);
  spread the power control command using a Walsh code assigned to the UE;
  map the power control command to reserved resource elements in at least one Physical Downlink Control Channel (PDCCH), wherein the reserved resource elements do not overlap other types of downlink control channels, and the mapping of the power control command is based on a physical channel resource allocation of resource elements within a subframe that are reserved for the at least one PDCCH;
  send the power control command to the UE through the resource elements reserved for the at least one PDCCH; and
  convey an indicator that specifies the resource elements reserved for the at least one PDCCH used for sending the power control command to the UE.

20. A method that facilitates altering an uplink transmit power in a wireless communication environment, comprising:
  receiving a power control command from a base station through resource elements reserved for at least one Physical Downlink Control Channel (PDCCH), wherein the power control command is mapped to resource elements reserved for at least one PDCCH, and wherein the reserved resource elements do not overlap other types of downlink control channels, and the mapping of the power control command is based on a physical channel resource allocation of resource elements within a subframe that are reserved for the at least one PDCCH;
  adjusting a transmit power for an uplink transmission based upon the power control command; and
  receiving an indicator from the base station, wherein the indicator specifies the resource elements reserved for the at least one PDCCH used by the base station for sending the power control command.

21. The method of claim 20, wherein the power control command is punctured into a control channel element (CCE) reserved for the at least one PDCCH.

22. The method of claim 20, wherein the indicator is received through at least one of system information, a Physical Broadcast Channel (PBCH), a Primary Synchronization Signal (PSS), a Secondary Synchronization Signal (SSS), a Primary Reference Signal (PRS), or a Reference Signal (RS).

23. The method of claim 20, further comprising inhibiting monitoring of downlink control information (DCI) format 3/3A based upon receipt of the indicator.

24. The method of claim 20, wherein the at least one PDCCH is at least one Relay-PDCCH (R-PDCCH).

25. The method of claim 20, further comprising detecting the power control command utilizing one or more Walsh codes assigned to a user equipment (UE) by the base station.

26. A wireless communications apparatus, comprising:
a memory that retains instructions related to receiving a power control command from a base station through resource elements reserved for at least one Physical Downlink Control Channel (PDCCH),
  wherein the power control command is mapped to resource elements reserved for at least one PDCCH, and wherein the reserved resource elements do not overlap other types of downlink control channels, and the mapping of the power control command is based on a physical channel resource allocation of resource elements within a subframe that are reserved for the at least one PDCCH,
  adjusting a transmit power for an uplink transmission based upon the power control command, and
  receiving an indicator from the base station, wherein the indicator specifies the resource elements reserved for the at least one PDCCH used by the base station for sending the power control command; and
a processor, coupled to the memory, configured to execute the instructions retained in the memory.

27. The wireless communications apparatus of claim 26, wherein the power control command is punctured into a control channel element (CCE) reserved for the at least one PDCCH.

28. The wireless communications apparatus of claim 26, wherein the indicator is received through at least one of system information, a Physical Broadcast Channel (PBCH), a Primary Synchronization Signal (PSS), a Secondary Synchronization Signal (SSS), a Primary Reference Signal (PRS), or a Reference Signal (RS).

29. The wireless communications apparatus of claim 26, wherein the memory further retains instructions related to inhibiting monitoring of downlink control information (DCI) format 3/3A based upon receipt of the indicator.

30. The wireless communications apparatus of claim 26, wherein the at least one PDCCH is at least one Relay-PDCCH (R-PDCCH).

31. The wireless communications apparatus of claim 26, wherein the memory further retains instructions related to detecting the power control command utilizing one or more Walsh codes assigned to a user equipment (UE) by the base station.

32. A wireless communications apparatus that enables managing uplink power in a wireless communication environment, comprising:
- means for receiving a power control command from a base station through resource elements reserved for at least one Physical Downlink Control Channel (PDCCH),
  wherein the power control command is mapped to resource elements reserved for at least one PDCCH, and
  wherein the reserved resource elements do not overlap other types of downlink control channels, and the mapping of the power control command is based on a physical channel resource allocation of resource elements within a subframe that are reserved for the at least one PDCCH;
- means for adjusting a transmit power for an uplink transmission based upon the power control command; and
- means for receiving an indicator from the base station that specifies the resource elements reserved for the at least one PDCCH used by the base station for sending the power control command.

33. The wireless communications apparatus of claim 32, further comprising means for controlling monitoring of downlink control information (DCI) format 3/3A as a function of the indicator.

34. The wireless communications apparatus of claim 32, further comprising means for detecting the power control command utilizing one or more Walsh codes assigned to a user equipment (UE).

35. A computer program product, comprising:
a non-transitory computer-readable medium comprising:
- code for receiving a power control command from a base station through resource elements reserved for at least one Physical Downlink Control Channel (PDCCH),
  wherein the power control command is mapped to resource elements reserved for at least one PDCCH, and
  wherein the reserved resource elements do not overlap other types of downlink control channels, and the mapping of the power control command is based on a physical channel resource allocation of resource elements within a subframe that are reserved for the at least one PDCCH;
- code for adjusting a transmit power for an uplink transmission based upon the power control command; and
- code for receiving an indicator from the base station that specifies the resource elements reserved for the at least one PDCCH used by the base station for sending the power control command.

36. The computer program product of claim 35, wherein the computer-readable medium further comprises code for controlling monitoring of downlink control information (DCI) format 3/3A as a function of the indicator.

37. The computer program product of claim 35, wherein the computer-readable medium further comprises code for detecting the power control command utilizing one or more Walsh codes assigned to a user equipment (UE).

38. A wireless communications apparatus, comprising:
a processor configured to:
- receive a power control command from a base station through resource elements reserved for at least one Physical Downlink Control Channel (PDCCH),
  wherein the power control command is mapped to resource elements reserved for at least one PDCCH, and
  wherein the reserved resource elements do not overlap other types of downlink control channels, and the mapping of the power control command is based on a physical channel resource allocation of resource elements within a subframe that are reserved for the at least one PDCCH;
- detect the power control command utilizing one or more Walsh codes assigned to a user equipment (UE);
- adjust a transmit power for an uplink transmission based upon the power control command; and
- receive an indicator from the base station that specifies the resource elements reserved for the at least one PDCCH used by the base station for sending the power control command.

* * * * *